United States Patent
Kress et al.

(10) Patent No.: US 12,439,175 B2
(45) Date of Patent: Oct. 7, 2025

(54) SYSTEMS AND METHODS FOR ULTRA-LOW-POWER, HIGH-SPEED SENSORS USING OPTICAL FILTERS

(71) Applicant: Imagia, Inc., Las Vegas, NV (US)

(72) Inventors: Gregory Kress, Las Vegas, NV (US); John Kenison, Sunnyvale, CA (US); Michael Joseph Chiasson, Lafayette, CO (US); David Stork, Portola Valley, CA (US); Mahshid Asri, San Jose, CA (US); Lawson Liem Fuller, Milpitas, CA (US)

(73) Assignee: Imagia, Inc., Mountain View, CA (US)

( * ) Notice: Subject to any disclaimer, the term of this patent is extended or adjusted under 35 U.S.C. 154(b) by 0 days.

(21) Appl. No.: 18/936,819

(22) Filed: Nov. 4, 2024

(65) Prior Publication Data
US 2025/0150722 A1    May 8, 2025

Related U.S. Application Data

(60) Provisional application No. 63/549,383, filed on Feb. 2, 2024, provisional application No. 63/595,900, filed on Nov. 3, 2023.

(51) Int. Cl.
| | |
|---|---|
| *H04N 5/335* | (2011.01) |
| *B82Y 20/00* | (2011.01) |
| *G02B 1/00* | (2006.01) |
| *H04N 23/55* | (2023.01) |
| *H04N 25/13* | (2023.01) |

(52) U.S. Cl.
CPC .............. *H04N 25/13* (2023.01); *B82Y 20/00* (2013.01); *G02B 1/002* (2013.01); *H04N 23/55* (2023.01)

(58) Field of Classification Search
CPC ..................................................... H04N 25/13
See application file for complete search history.

(56) References Cited

U.S. PATENT DOCUMENTS

| | | | |
|---|---|---|---|
| 10,855,892 B2* | 12/2020 | Chao | ........................ G02B 7/02 |
| 2003/0223622 A1 | 12/2003 | Simon et al. | |
| 2012/0082978 A1 | 4/2012 | Pilarski et al. | |
| (Continued) | | | |

OTHER PUBLICATIONS

Colburn, Shane; Chu, Yi; Shlizerman, Eli; Majumdar, Arka (2018). An Optical Frontend for a Convolutional Neural Network. Optica.
(Continued)

*Primary Examiner* — Gary C Vieaux
(74) *Attorney, Agent, or Firm* — PCFB, LLC; Justin K. Flanagan

(57) ABSTRACT

Systems and methods are described herein that use passive metasurfaces for optical domain image processing, reducing power consumption, latency, and/or computational load in computer vision. As an example, an optical detection device may include an optical assembly that generates multiple copies of an image, which are processed by an array of metasurface filters. Each metasurface filter applies a predefined pattern to a specific image copy. The filtered image copies are used to identify features of interest with reduced computational demands. For example, a first filter may target a first feature, while a second filter targets a second feature. The intensity of the optical radiation output by each filter is used to determine a confidence level that each respective feature is present in the image.

7 Claims, 28 Drawing Sheets

(56) References Cited

U.S. PATENT DOCUMENTS

| | | |
|---|---|---|
| 2013/0016201 A1 | 1/2013 | Vaidya |
| 2014/0267878 A1 | 9/2014 | Geelen et al. |
| 2019/0196068 A1* | 6/2019 | Tsai .................. G02B 1/002 |
| 2020/0225386 A1* | 7/2020 | Tsai .................. G02B 1/002 |
| 2020/0378751 A1 | 12/2020 | Acker |
| 2021/0028215 A1* | 1/2021 | Devlin ............. G02B 27/4233 |
| 2021/0381893 A1 | 12/2021 | Balas |
| 2021/0394416 A1 | 12/2021 | Fuhrmann et al. |
| 2022/0336509 A1 | 10/2022 | Zhang et al. |
| 2023/0108401 A1 | 4/2023 | Husheer et al. |
| 2024/0280813 A1 | 8/2024 | Tiku et al. |

OTHER PUBLICATIONS

Zhou, Junxiao & Qian, Haoliang & Chen, Ching-Fu & Zhao, Junxiang & Li, Guangru & Wu, Qianyi & Luo, Hailu & Wen, Shuangchun & Liu, Zhaowei. (2019). Optical edge detection based on high-efficiency dielectric metasurface. Proceedings of the National Academy of Sciences. 116. 10.1073/pnas.1820636116.

Bi, Xinyi & Guo, Xuyue & Wu, Xuanguang & Fan, Xinhao & Wei, Bing-Yan & Wen, Dandan & Liu, Sheng & Zhao, Jianlin & Li, Peng. (2023). Wideband optical edge detection based on dielectric metasurface. Applied Physics Letters. 123. 10.1063/5.0161145.

Cotrufo, Michele & Singh, Sahitya & Arora, Akshaj & Majewski, Alexander & Alù, Andrea. (2023). Polarization imaging and edge detection with image-processing metasurfaces. Optica. 10. 10.1364/OPTICA.500121.

International Search Report for App. No. PCT/US2024054464 mailed Jan. 24, 2025.

Written Opinion for App. No. PCT/US2024054464 mailed Jan. 24, 2025.

\* cited by examiner

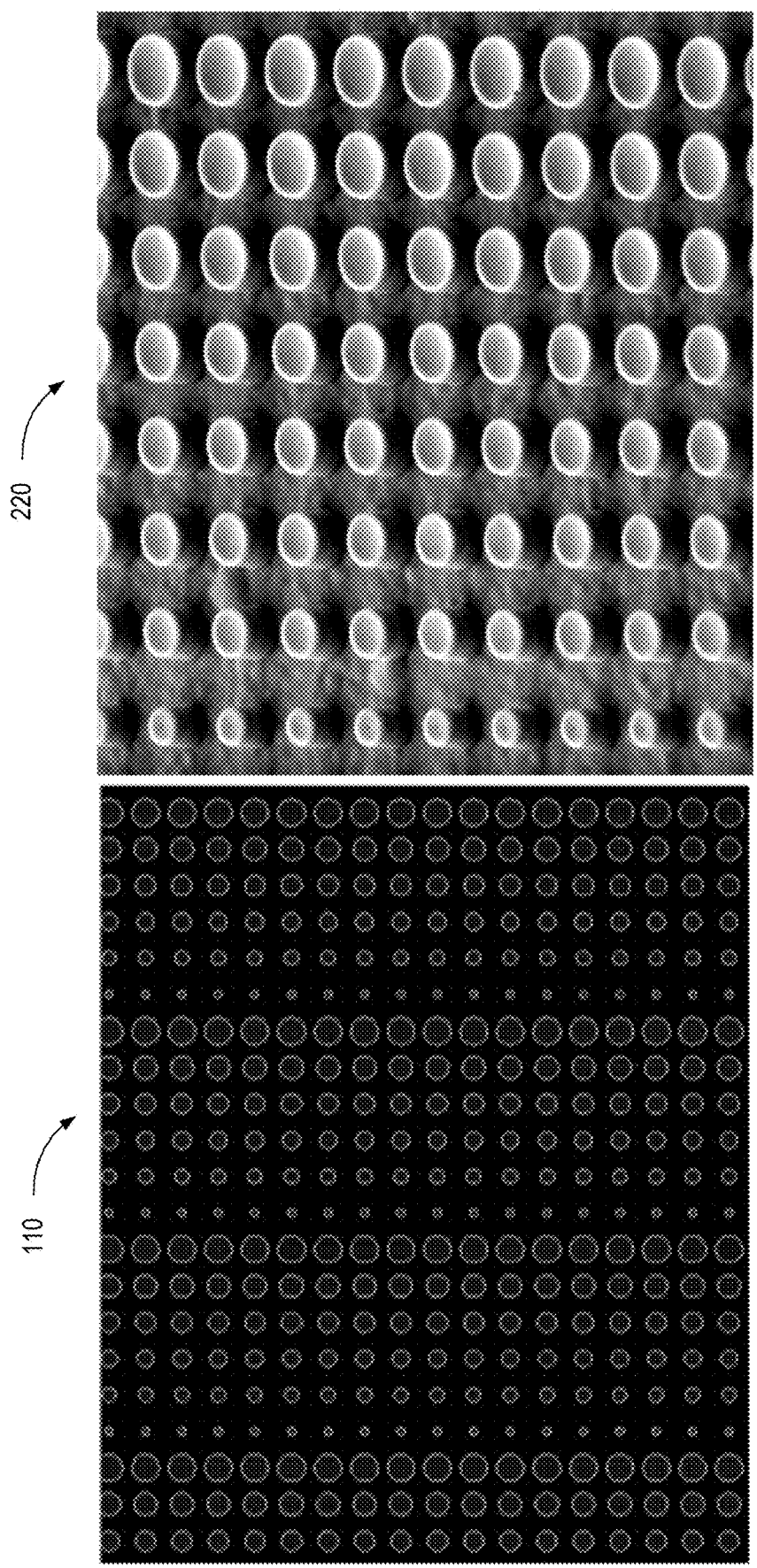

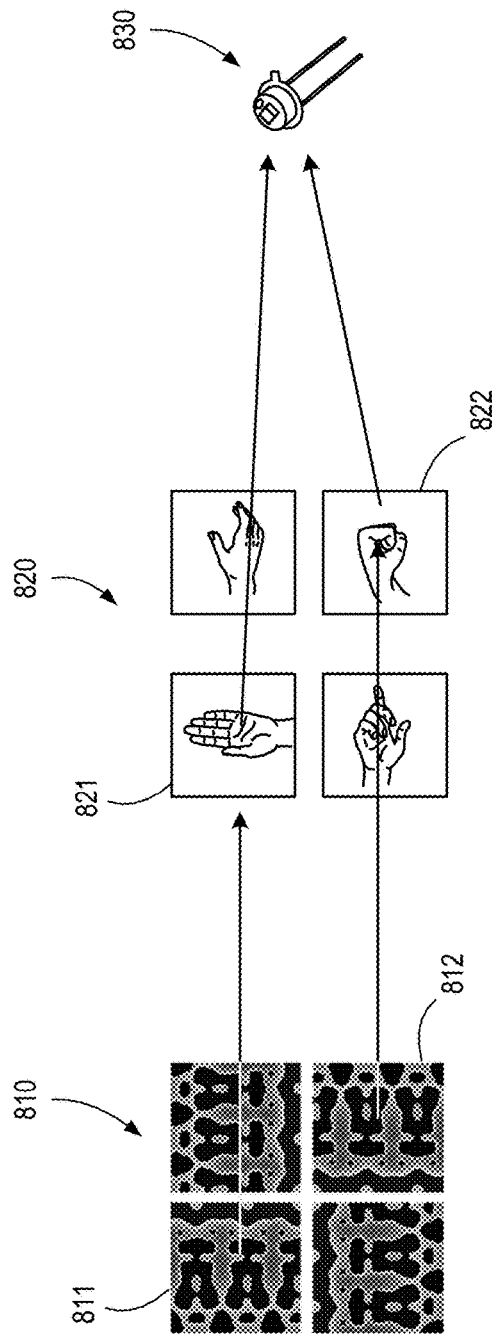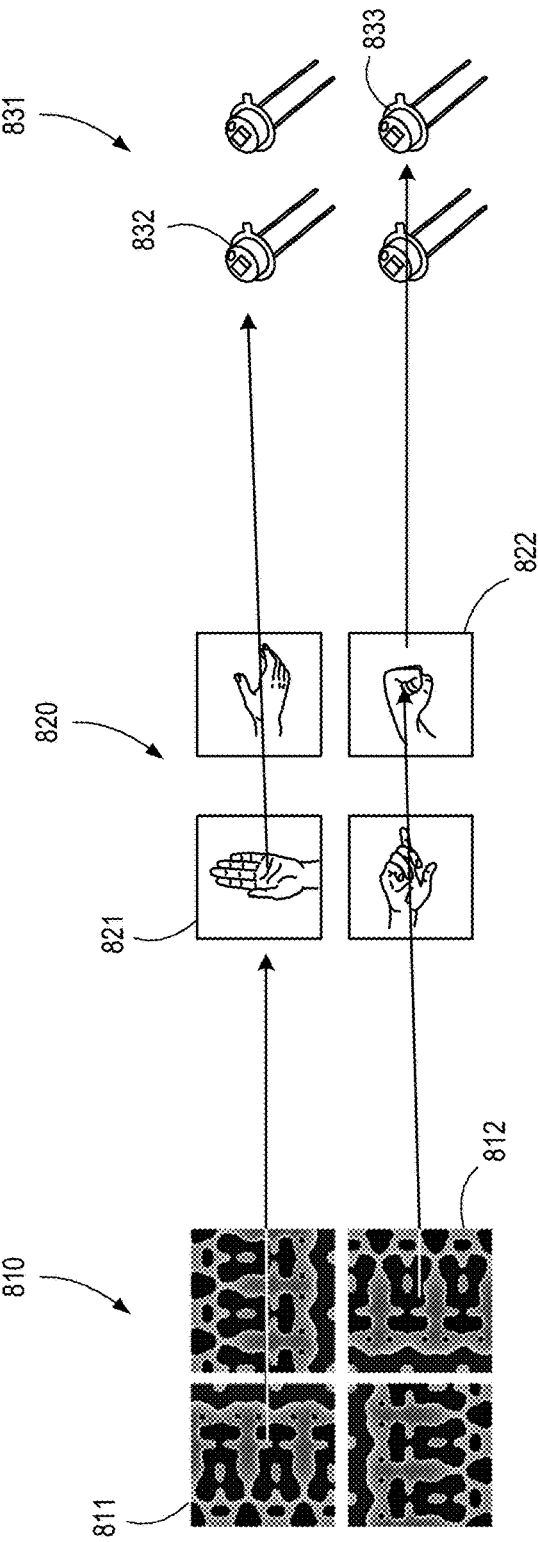
FIG. 8A
FIG. 8B

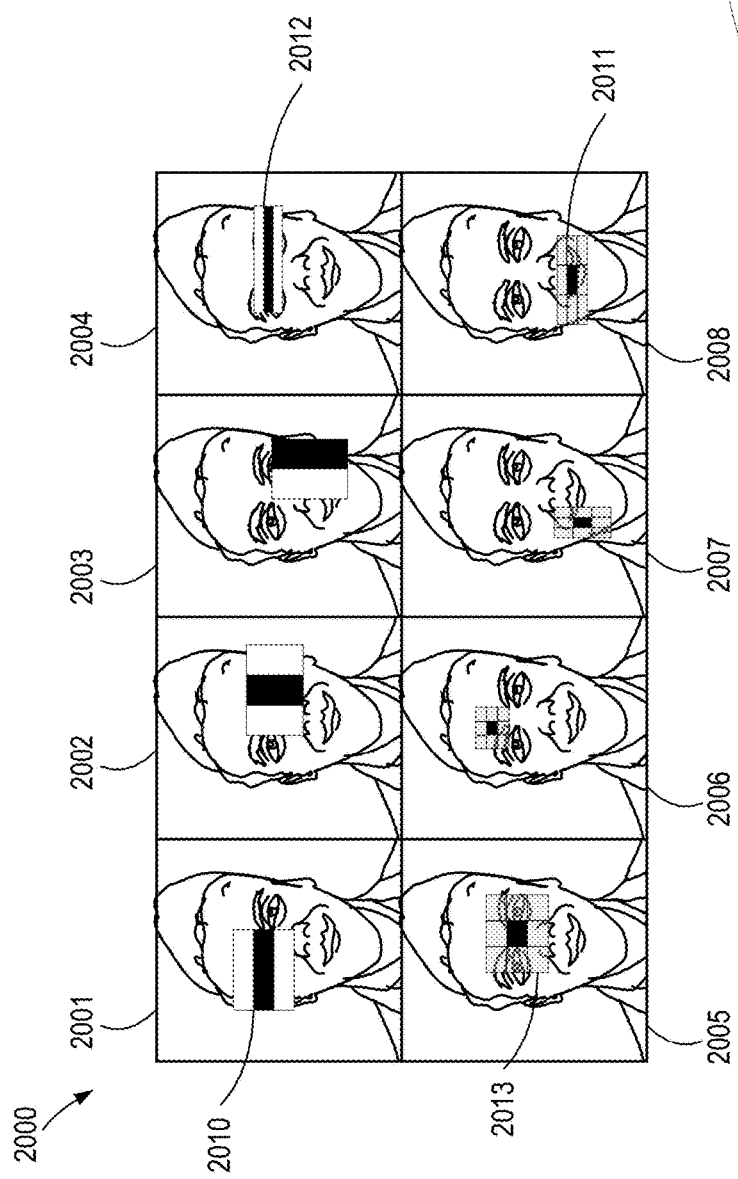
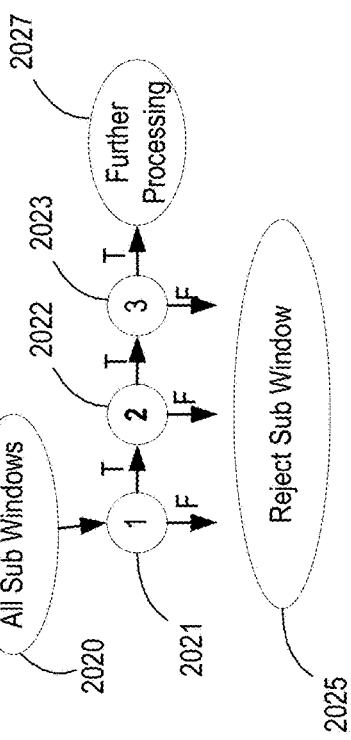
FIG. 20A
FIG. 20B

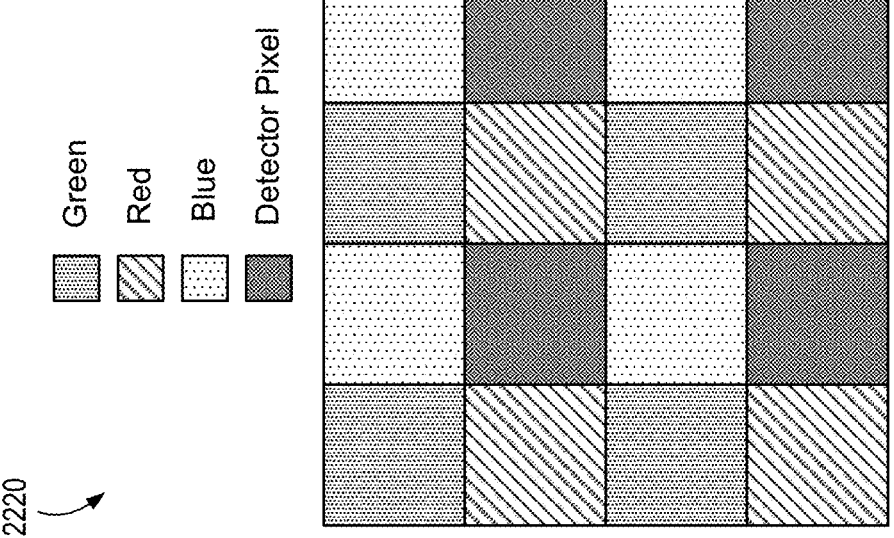
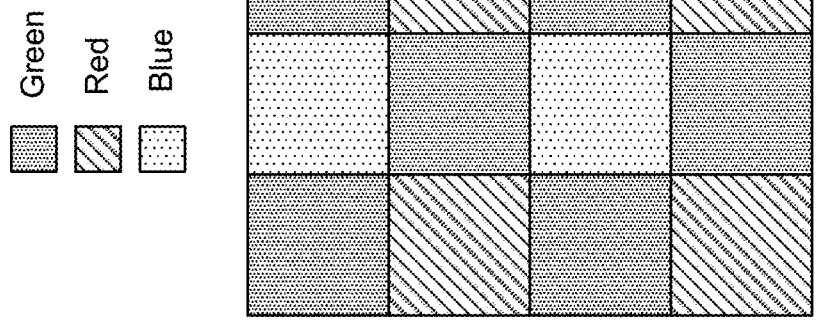
FIG. 22

SYSTEMS AND METHODS FOR ULTRA-LOW-POWER, HIGH-SPEED SENSORS USING OPTICAL FILTERS

PRIORITY APPLICATIONS

This application claims the benefit of and priority to U.S. Provisional Patent Application No. 63/549,383 filed on Feb. 2, 2024 titled "Ultra-Low Power, High-Speed Detectors Using Metasurface Optical Filters," and U.S. Provisional Patent Application No. 63/595,900 filed on Nov. 3, 2023 titled "Systems and Methods for Optical Metasurface Image Compression," each of which is hereby incorporated by reference in its entirety.

TECHNICAL FIELD

This disclosure relates to optical computing, image processing, and optical metamaterial devices.

BRIEF DESCRIPTION OF THE DRAWINGS

FIG. 1 illustrates a top-down view of an example representation of a pattern of deflector elements for a metalens structure, according to one embodiment.

FIG. 2 illustrates an enlarged perspective view of the example representation of the pattern of deflector elements in the metalens of FIG. 1, according to one embodiment.

FIG. 8A illustrates the example detection system of FIG. 7A configured to recognize hand gestures, according to one embodiment.

FIG. 8B illustrates the example detection system of FIG. 7B configured to recognize and distinguish between various hand gestures, according to one embodiment.

FIG. 20A illustrates an example diagram of Haar-like features applied across eight identical image copies, according to one embodiment.

FIG. 20B illustrates a high-level block diagram of a sub-window evaluation process in a detection system, according to one embodiment.

FIG. 22 illustrates a modified Bayer color filter configuration on an image sensor with dedicated feature detection pixels, according to one embodiment.

DETAILED DESCRIPTION

Figure 3A:
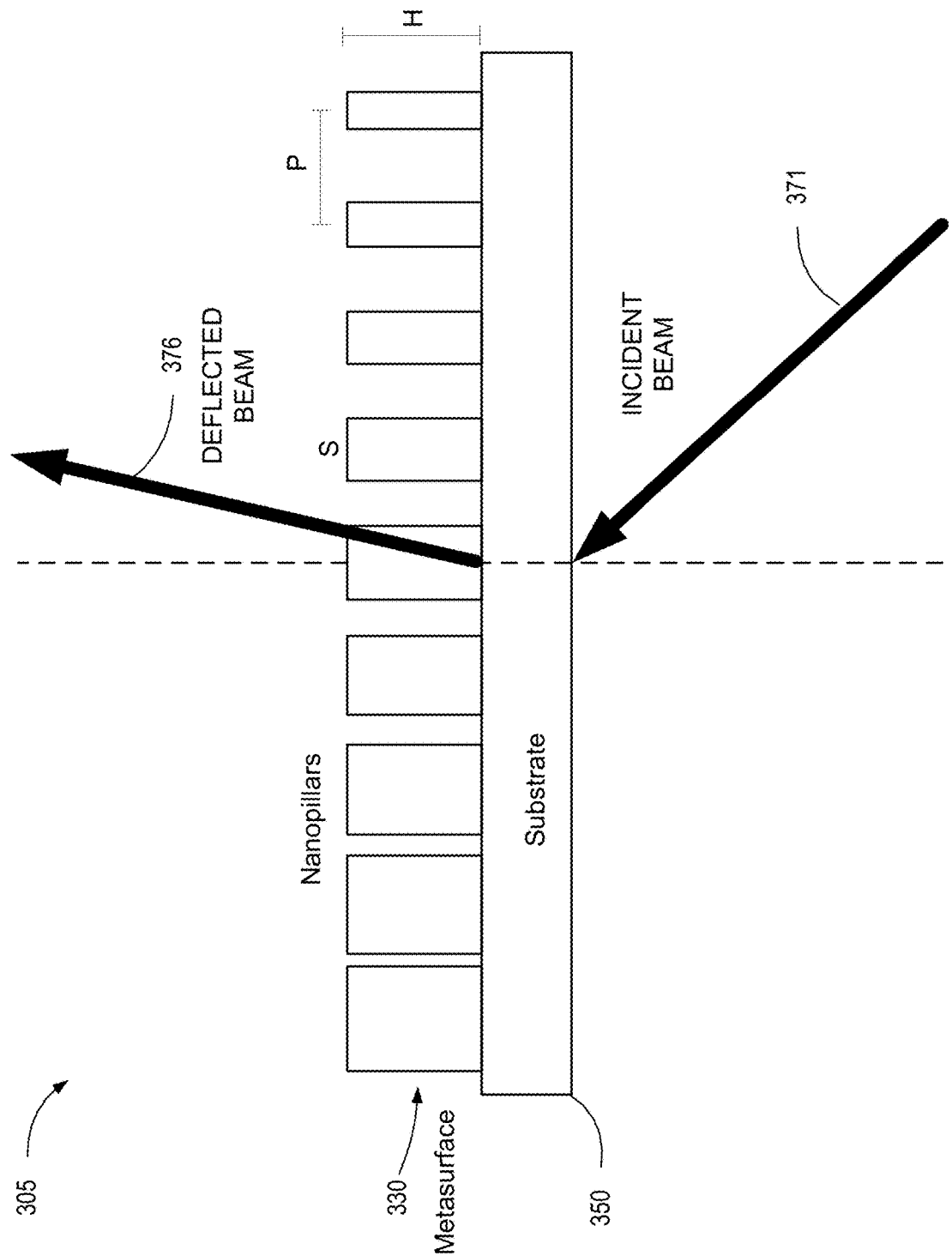
FIG. 3A illustrates an example block diagram of a side view of a metalens with nanopillar deflectors positioned on a substrate to transmissively steer optical radiation, according to one embodiment.

Image processing operations are often performed using an electronic processor after an image is captured in digital memory. For example, computer vision algorithms frequently process captured images using computer processing units (CPUs) and/or graphics processing units (GPUs) to mathematically calculate image transformations. The computational demand and associated power demand for computer vision technology are significant. Computer vision algorithms are often processor-intensive and can account for more than 50% of the computational needs of a given system. Examples of image processing operations and transformations include but are not limited to edge detection, motion detection, pattern recognition, feature recognition, object identification and/or classification, smoothing, blurring, sharpening, color correction, noise removal, simultaneous location and mapping, depth, proximity, and the like.

Computer vision technology is utilized in various vertical markets including, without limitation, the automotive industry (especially autonomous driving), robotics, automation, spatial computing, mobile device, drones, and the like. In some instances, numerous camera modules may be utilized for a given task, and the computational demand and associated power requirements are significant. For example, a vehicle may have dozens of camera modules, and computer vision processing may be performed on the images captured from many of the camera modules at the same time.

Moreover, some existing approaches for detecting features within an image or video frame involve using traditional optical lenses and optical image sensors (e.g., high-resolution sensors) to capture an image. The captured image is then processed using computational processing via, for example, CPUs and/or dedicated GPUs. In some instances, traditional optical filters (such as an infrared filter or polarizing filter) may be used as part of the high-resolution image capture process.

For example, a traditional camera may be used to capture an image or video frame of a scene that may or may not include a target or feature of interest. Examples of targets or features of interest include, but are not limited to, a user, a user's hand(s), a specific hand gesture, a face, a person, an animal, a vehicle, signage, particular objects, specific patterns, alphanumeric characters, etc. Traditional image processing techniques (e.g., standard detection modalities) include a first step of image acquisition and a second step of image processing. Both the image capture step and (especially) the image processing step have relatively high computational demands, relatively high power consumption demands, and/or relatively high data storage demands. Traditional image acquisition and processing approaches are able to detect features of interest with some delay, corresponding to the delay associated with the image acquisition and subsequent processing. Lower-power and lower-performance processing devices generally result in longer delays, while higher-power and higher-performance processing devices are generally faster.

In some instances, a system may be configured to only or merely detect the presence or absecence of a particular feature of interest. In other instances, the detection of a pattern or feature in an image or video frame (e.g., a feature may be the presence of a hand in the image) may operate to bring a device out of a low-power "sleep" state, after which a high-resolution and/or higher frame rate sensing may be utilized. Traditional image capture and processing techniques are error-prone and consume a relatively high amount of computational and power resources. In some embodiments, the presently described systems and methods are used for motion estimation, image rotation estimation, object location tracking, image change detection, and/or other computer vision processes.

In various embodiments, the presently described systems and methods utilize one or more passive metasurfaces to implement image processing operations in the optical domain. The embodiments described herein reduce the overall power dissipation for image processing, reduce the latency of processing the captured images, and/or lower the overall computational requirements of a given computer vision system. In other embodiments, non-metasurface optical filters or a combination of metasurfaces and non-metasurfaces are utilized to implement the image processing operations in the optical domain.

According to various embodiments, passive metasurfaces or other optical filters are used to perform image processing operations that would otherwise be done post-capture via a processor. One or more passive metasurfaces or other optical filters may be positioned within the optical path of an image capture system. One or more passive metasurfaces may act as a filter to apply a mathematical transformation to an incoming image. For example, the optical radiation associated with a given image can be split (copied) and directed to any number of passive metasurfaces (or spatial regions of a single metasurface) in the optical path of the image capture system. Each passive metasurface (or spatial region of a single metasurface) may transform the received image according to any of a wide variety of optically implemented mathematical operations.

For example, one optical filter may implement an optical transformation (e.g., convolution) corresponding to edge detection. Another optical filter may implement an optical transformation for a predetermined pattern recognition. Any number of optical filters (or spatial regions of a single metasurface) may be used to implement any of a wide variety of computer vision algorithms in the optical domain by modifying the optical radiation as it passes through the optical filter. As noted herein, the optical filter may be implemented using any of a wide variety of optical elements, masking elements, lenses, mirrors, metasurfaces (e.g., a metafilter and/or a metalens), polarization elements, neutral density or gradient filter elements, and/or other optical devices and elements. In addition to applying convolutions optically, "average pooling" of convolution outputs/results can also be achieved optically with a metasurface or lens array.

An original image (i.e., optical radiation prior to being transformed by a metasurface) and each of the transformed copies of the image are processed by one or more metasurfaces or other optical filters. The processed image and copies are then directed toward a multipixel imaging sensor (such as a CCD or CMOS imaging sensor), photodetector, or photodetector array. A different spatial region of the imaging sensor or photodetector array may receive each of the transformed copies of the image and the original image.

For example, an optical system may include three different passive optical filters to generate three different image transformations. An incoming image is split (copied) four times. Each of the three passive optical filters (e.g., metasurfaces) "processes" or "filters" one of the image copies to generate the three different image transformations. The three different image transformations and the original image are all directed toward different spatial regions of a multipixel imaging sensor. For example, if a 12-megapixel imaging sensor is utilized, each of the four images (the three image transformations and the original image) may be directed toward a different 3-megapixel quarter of the image sensor. As another example, if a 1-megapixel imaging sensor is utilized, each of the four images may be directed toward a different quarter-megapixel portion of the image sensor.

A digital or other electronic processing unit may combine the four captured images to accomplish the equivalent of a wide variety of computer vision processing algorithms. As a specific example, one of the image transformations may be an edge detection image (e.g., an edge map or visual edge map). The controller or another optical element may add or otherwise combine the edge detection image to the original image to generate a sharpened version of the image. As compared to traditional image processing approaches using CPU and GPU-based mathematical operations, the presently described systems and methods allow for reduced computations, reduced power consumption, and reduced latency.

In the specific example of generating a sharpened image, a traditional approach might include capturing an image and then mathematically computing a new image using matrix multiplication, subtraction, addition, and convolution. Accordingly, the sharpened image is generated after the processing time required to process the original image. The processing step requires significant computational resources and power.

In contrast, the proposed incorporation of one or more optical filters (e.g., metasurfaces) within the optical path of an image capture device implements a near-instantaneous, zero-electrical-power creation of various image transformations at the same time the original image is captured. Simple addition and/or subtraction of the original image with one or more of the image transformations may be performed electronically immediately after image capture to accomplish a target computer vision or other image processing function.

Each optical filter or metasurface (or region of a single metasurface) within the optical path of the image capture device may implement a different image transformation. Examples of possible image transformations include but are not limited to, edge detection transformations, blurring transformations, movement detection transformations, static object detection transformations, object recognition or detection transformations, feature recognition or extraction transformations, pattern recognition transformations, and the like.

In some embodiments, an optical filter (e.g., a metasurface) may implement an image transformation corresponding to edge detection for image compression algorithms. In such an embodiment, an image capture device may capture a compressed version of an image simultaneously with an uncompressed version of the image. Each transformed image is captured by a portion of the imaging sensor. Accordingly, it is appreciated that for n−1 image transformations, the effective resolution of the imaging sensor is reduced by a factor of 1/n. The image capture can be restricted at the sensor level to a small "region of interest," corresponding only to the compressed image data in a low-power state, requiring less power and memory.

If a 100-megapixel sensor is utilized and nine transformed images are captured together with the original image, each captured image (transformed images and the original image) is captured using 10 megapixels. In some embodiments, the sensor may not be divided equally between the original image and the transformed images. For example, the original image may be directed to one half of the sensor to utilize a full 50 megapixels of the sensor. The nine transformed images may divide up the other half of the sensor such that each transformed image is captured using approximately 5.5 megapixels.

Some of the presently described systems and methods include the use of an optical filter, optical mask, and/or metasurface optical filter to convolve an input image with a predefined pattern corresponding to the feature of interest. Any number of metasurface optical filters may be used to convolve the image with any number of predefined patterns or features. In some embodiments, traditional optics (or another metasurface-based optical device) may be used to split or copy the image into any number of image copies. For example, image copies may be created using a microlens array, a zone plate microlens array, an array of beamsplitters, partial mirrors, metalens arrays, and/or combinations thereof.

Each image copy may be directed to a unique optical filter, such as a metasurface optical filter, for convolution with a distinct or unique predefined filter pattern. Each different predefined filter pattern may correspond to a different feature of interest or different poses or orientations of the same feature. As such, any number of image copies may be directed for convolution by any number of optical filters for the detection of any number of different features of interest.

The convolution of the image copy with a particular filter pattern may result in a relatively high intensity of light output if the image contains the associated feature of interest. Conversely, the convolution of the image copy with a particular filter pattern may result in a relatively low intensity of light output if the image does not contain the associated feature of interest.

Each optical filter may be associated with a single unique feature of interest, such that an intensity characteristic of the output optical radiation corresponds to the likelihood or confidence level that the feature of interest is present in the image. For example, the salient intensity characteristic may be one of a relative intensity, a spatial change in intensity within the same image or image copy, and/or a temporal change in intensity over time within the same or different images. In other embodiments, each optical filer may be associated with multiple features of interest, such that the intensity of output optical radiation corresponds to the likelihood or confidence level that any of the multiple features of interest are present in the image. In both cases, the brightness level or intensity of the output optical radiation is related to the probability of whether the target pattern (one or more features of interest) is in the image or frame.

In some embodiments, the device may include a single filter and detector so that no image copies are needed. For example, an optical detection device may comprise an optical assembly, a metasurface optical filter, and a photosensor. The optical assembly may operate to receive optical radiation as an image. The metasurface optical filter operates to convolve the image with a predefined filter pattern associated with a feature of interest, where an intensity of optical radiation output by the metasurface optical filter corresponds to a confidence level that the feature of interest is present in the image. The photosensor receives the optical radiation output from the metasurface optical filter. Additionally, the device may include a detection subsystem to transmit a confidence signal corresponding to a confidence level that the feature of interest is present in the image based on the intensity of the optical radiation detected by the photosensor.

In various embodiments, a combination of diverse filters, including optical filters configured to detect spatial frequencies, features or patterns, color tone(s), spectral reflectivity, polarization response, intensity, and/or temperature, can be used to extract specific information from an image. In some embodiments, a single photodiode can be paired with each optical filter (e.g., metasurface), thereby replacing a traditional high-resolution image sensor and CPU and enabling the detection of features of interest with significantly lower power consumption. The presently described systems and methods simplify detection by focusing on feature detection without the added complexity of determining other attributes, such as the feature's precise location, size, or quantity within the image.

In some embodiments, a single photodiode may be used to receive the combined light output of all the optical filters as a method for optical average pooling (e.g., all the metasurface optical filters and/or all the distinct regions of a single metasurface optical filter). Output circuitry (a detection subsystem), such as a comparator, may compare the intensity of the light received by the photodiode to a threshold value. The threshold value may be used such that the comparator signal will output a high value (or low in an inverted system) in response to the presence of any one of the features of interest in the image. That is, the detection subsystem can measure the combined light output intensity by the optical filters to determine that one or more of the features of interest are present in the image. The detection subsystem may be configured to output a binary high or low signal. For example, a confidence signal may use a first binary state to indicate that none of a set of at least one feature of interest is present in an image and a second binary state to indicate that one or more of the at least one feature of interest is present in the image. The threshold may be configured such that the output signal is high when a single feature of interest is detected or requires that a threshold number of features of interest are detected. In another embodiment, the output may be a single analog channel where a low signal corresponds to a low confidence interval, and a high signal corresponds to a high confidence interval, with a continuum in between.

In other embodiments, the detection subsystem may indicate the number of features of interest present in the image based on the intensity of optical radiation received by the single photodiode. For example, a single feature within the image may result in a first intensity level, while a second feature within the image may result in a second intensity level, and so on. The detection subsystem may generate a non-binary signal (e.g., an analog signal or analog signals) that indicates the number of features detected.

In various embodiments, the output of each optical filter may correspond to a confidence level that the associated feature of interest is present in the image, where higher intensities of output optical radiation correspond to higher confidence levels. The output signal by the detection circuitry connected to a single photodiode for the array of multiple optical filters may correspond to a combined confidence level that one or more of the features of interest are present, read out as an analog value within some range.

The presently described systems and methods allow for extremely low-power, low-cost, and nearly instantaneous detection of features of interest in a compact package. As described below, the filtering may happen at the Fourier plane, in some embodiments. The intensity is captured in the real part of the Fourier transform, which is registered by the sensor. The other information is in the imaginary part (phase space). The presently described systems and methods avoid the complexities (and possible errors) in trying to determine other characteristics of the feature, such as where it is in the image, how big it is, how many there are, etc.

In some embodiments, output optical radiation from each optical filter is received by a different photodiode (or other photodetector sensor). In such an embodiment, the intensity detected by each photodiode corresponds to the confidence level that a particular feature of interest is present in the image. The detection subsystem may generate a plurality of binary signals that each indicate the presence or absence of a given feature of interest in the image. Alternatively, the detection subsystem may generate a more complex communication signal that indicates which of the plurality of features of interest are detected in the image or frame.

As a specific example, an optical detection device may include an optical assembly to receive optical radiation as an image and generate a plurality of optical image copies. The detection device may also include an array of metasurface optical filters to convolve the optical image copies with a set of predefined filter patterns associated with a set of features of interest. For example, the array of metasurface optical filters may include a first metasurface optical filter to convolve a first optical image copy with a first predefined filter pattern associated with a first feature of interest. The intensity of optical radiation output by the first metasurface optical filter corresponds to a confidence level that the first feature of interest is present in the image. The array of metasurface optical features may include a second metasurface optical filter to convolve a second optical image copy with a first predefined filter pattern associated with a second feature of interest. The intensity of optical radiation output by the second metasurface optical filter corresponds to a confidence level that the second feature of interest is present in the image.

A single photosensor (e.g., photodiode) may receive the combined optical radiation output by the array of metasurface optical filters. In such an embodiment, the detection subsystem may transmit a confidence signal corresponding to a confidence level that one or more of the features of interest are present in the image based on the intensity of the combined optical radiation received by the single photosensor. Alternatively, the optical detection device may include a set of photosensors that are used to independently detect the presence or absence of each feature of interest associated with each respective metasurface optical filter. Furthermore, the response of multiple photosensors can be summed or averaged to achieve both selective and non-selective detection modes in one system.

Reading a single photodiode is much faster and extremely low-power compared to traditional methods of image acquisition and processing, time-of-flight analysis, point-cloud mapping, depth mapping, etc., and requires little to no system memory. In some embodiments, a device may use the systems and methods described herein while in a low-power, hibernation, or sleep mode to detect a feature (e.g., a hand, a person, an object, etc.) that triggers a "wake" state. The device may then use more complex image capture and analysis and/or higher-resolution images in a wake state for various purposes. Alternatively, the system may be used to register user interactions (e.g., interpreting hand gestures) without exiting the sleep or low-power state.

In some embodiments, a feature detection system may leverage a set of advanced optical and digital processing techniques to enhance real-time detection capabilities while minimizing computational load. For example, the system may include a plurality of optical filters to generate multiple transformed versions of an original image. The transformed images may be captured simultaneously by a multipixel image sensor, which facilitates parallel processing and reduces latency in image analysis. A digital processing unit within the system may apply different sets of digital weightings to the captured transformed images, allowing for the detection of various features of interest from the same set of optical data. This enables flexible and efficient detection workflows where the same transformed images (and possibly an "original" image) are utilized for different analytical purposes, such as distinguishing between different objects or gestures within the field of view.

As an example, one or more metasurface optical filters (or other optical filters) may perform specific transformations on an incoming image, such as edge detection, pattern recognition, and/or feature extraction. The transformations occur in the optical domain, significantly reducing the need for post-processing computations typically handled by an electronic CPU or GPU. The system may differentiate between multiple different features, such as detecting a "hand" as a first feature and a "face" as a second feature, by applying distinct digital processing weightings to the same set of transformed images. The system can be dynamically modified for different detection responses without requiring additional image acquisition or repeated processing.

In some embodiments, the presently described systems and methods avoid the complexity of higher-order convolutions, including the complexity associated with image reconstruction, feature localization, scaling, etc. Moreover, the entire device can be much smaller in physical volume as compared to traditional approaches. The some embodiments, convolutions can be performed in parallel instead of in series. In other embodiments, several optical convolutions may be performed in series and/or in parallel.

The feature sizes, interelement spacings, and/or shapes of the features forming the metalens may be determined using holographic techniques. Examples of possible metasurfaces and metalenses forming a "metafilter" are described herein and in greater detail within U.S. Pat. No. 11,874,476, issued on Jan. 16, 2024, which is hereby incorporated by reference in its entirety. Additionally, it is appreciated that a wide variety of alternative metalens and metasurface architectures may be modified and adapted for use in the presently described systems and methods to generate transformed images.

The components of the disclosed embodiments, as generally described and illustrated in the figures herein, could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail in order to avoid obscuring aspects of this disclosure. The embodiments of the systems and methods provided within this disclosure are not intended to limit the scope of the disclosure but are merely representative of possible embodiments. In addition, the steps of a method do not necessarily need to be executed in any specific order or even sequentially, nor do the steps need to be executed only once.

FIG. 1 illustrates a top-down view of an example representation of a pattern of deflector elements 110 for a metalens structure, according to one embodiment. As illustrated, a uniform square grid of deflector elements 110 may pattern the deflector elements 110 with uniform spacings between adjacent or nearest neighbor deflector elements with up to approximately a 100% fill factor. Moreover, the deflector elements 110 may be configured with uniform heights. In the illustrated example, the deflector elements 110 comprise circular pillars arranged in a repeating pattern of pillar cross-sectional areas (diameters).

FIG. 2 illustrates an enlarged perspective view of the example representation of the pattern of deflector elements in the metalens of FIG. 1, according to one embodiment. As illustrated, an array of deflector elements 220 includes a uniformly spaced arrangement of circular pillars extending from a substrate. The deflector elements 220 have different pillar cross-sectional areas (diameters) that increase along one dimension (left to right) and are constant along the other dimension (top to bottom). Alternative patterns of pillar cross-sectional areas (diameters) may be used to achieve target deflection patterns.

FIG. 3A illustrates an example block diagram of a side view of a metalens 305 with nanopillar deflector elements 330 positioned on a substrate 350, according to one embodiment. The metalens 305 transmissively steers or otherwise phase-modulates incident optical radiation 371 as deflected optical radiation 376 at a target deflection angle, beamform, or phase-modulated transmission profile. A single metalens may have more than one focal spot or focal length. As illustrated, the nanopillar deflector elements 330 may have a uniform height, H, and varying cross-sectional areas (diameters) as a function of a side length(S). In the illustrated example, the nanopillar deflector elements 330 are evenly spaced with a nearest neighbor on-center spacing distance, P.

The spacing between the centers of adjacent or nearest neighbor nanopillars may be constant despite the varying cross-sectional areas (diameters) of the pillars. As described herein, the dimensions, pattern, and spacings of the nanopillars are selected to achieve a target deflection pattern (e.g., angle of deflection, dispersion, collimation, convergence, and/or a combination thereof) and frequency response (e.g., target operational bandwidth of optical radiation). The interelement spacing may be on a square grid or another repeating geometric grid, such as a hexagonal grid.

Figure 3B:
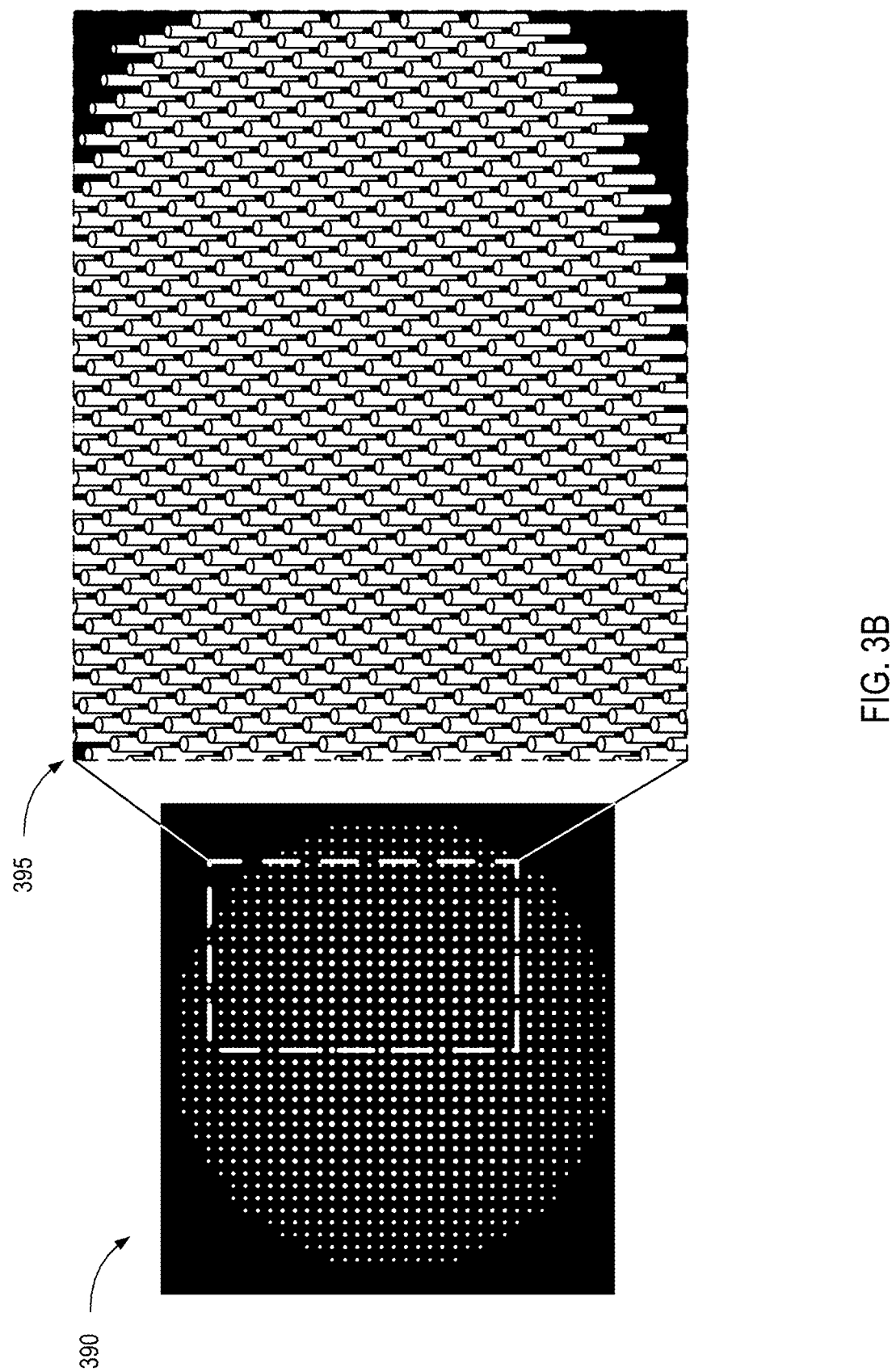
FIG. 3B illustrates a metalens with a radially symmetric pattern of pillar diameters to deflect optical radiation, according to one embodiment.

FIG. 3B illustrates a metalens 390 with a radially symmetric pattern of pillar cross-sectional areas (diameters) to focus optical radiation, according to one embodiment. The pattern of cross-sectional areas (diameters) to attain a target deflection pattern can be calculated based on the subwavelength amplitude and phase response of each subwavelength pillar. In some instances, numerical simulations may be used to determine the pattern of cross-sectional areas (diameters) for a particular deflection pattern (e.g., to focus the optical radiation with an effective focal length). The metalens 390 may be circular, oval, irregularly shaped, or an n-sided polygon, such as a square or rectangle. Expanded window 395 shows an enlarged perspective view of the passive pillars forming the deflector elements of the metalens. Due to the limitations of the drawing, the different cross-sectional areas (diameters) of the pillars are not illustrated in the expanded window 395.

The illustrated example is not drawn to scale. For example, a metalens measuring four millimeters (4 mm) on each side would include millions or even hundreds of millions of pillars with varying diameters at uniform interelement spacings. Rather, the illustrated example is intended to facilitate the visualization of a possible pattern of radially symmetrical and radially repeating pillar diameters. The exact pillar diameters and relative sizes may vary and are based on the results of phase gradient calculations or simulation results. It is appreciated that any of the various analytical formulas for lens calculations and holographic techniques may be utilized, as understood by those of skill in the art. For example, topological optimization approaches, such as an adjoint or inverse design approach, may be utilized to determine a distribution of non-periodic structures to achieve a target optical performance.

Figure 4:
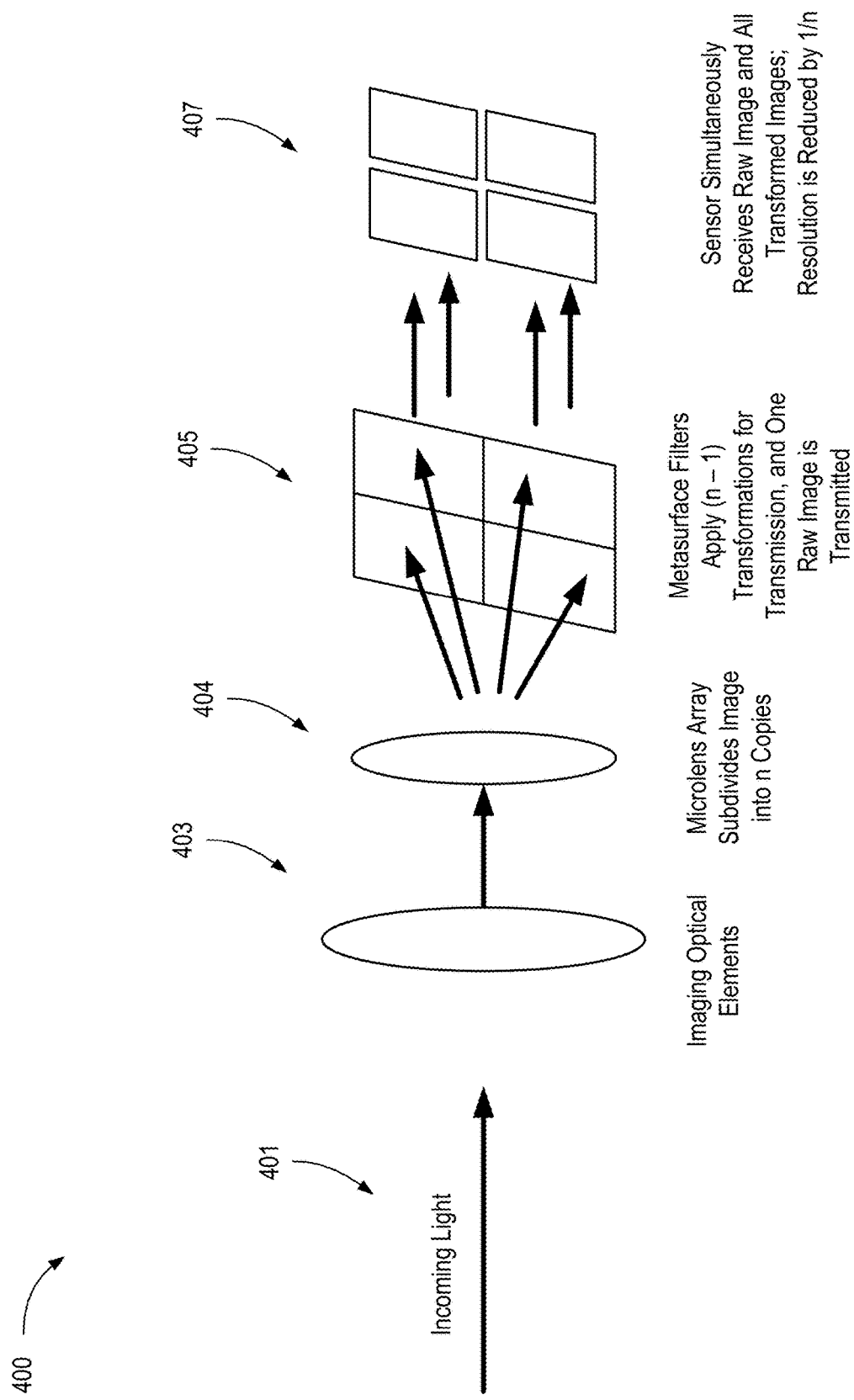
FIG. 4 illustrates a block diagram of an optical system for image processing using a passive metasurface filter, according to one embodiment.

FIG. 4 illustrates a block diagram of an optical system 400 for image processing using a passive metasurface filter 405, according to one embodiment. Incoming light 401 associated with an image is received by traditional imaging optical elements 403, such as lenses. The focused and flattened image plane would traditionally be directed onto a multipixel imaging sensor for full-resolution image capture.

Instead, an optical subsystem 404 (e.g., lenses, microlenses, etc.) generates four copies of the original image to be passed through the four different subregions of the metasurface 405. One of the copies is directed unmodified onto one-quarter of the imaging sensor 407, while three distinct metasurfaces 405 (not separately numbered in this figure) operate to transform the other three copies of the image, generating three different transformed images.

For example, one of the subregions of the metasurface 405 may operate to generate a transformed image corresponding to an edge detection algorithm, another may perform a blurring algorithm, and another may apply a color filter algorithm, object detection, feature detection, or similar transformations. Each transformed image is captured by a different quadrant of the sensor 407 simultaneously.

Once captured, the original image may be combined with one or more of the transformed images to accomplish specific computer vision or image processing algorithms, achieving this with no time delay between the raw and transformed images. Various examples are provided, but it is appreciated that many other image-processing algorithms are possible, as understood by those skilled in the art. For instance, one metasurface may implement a feature detection algorithm to identify regions of the image corresponding to human faces, while another may perform edge detection.

Figure 5A:
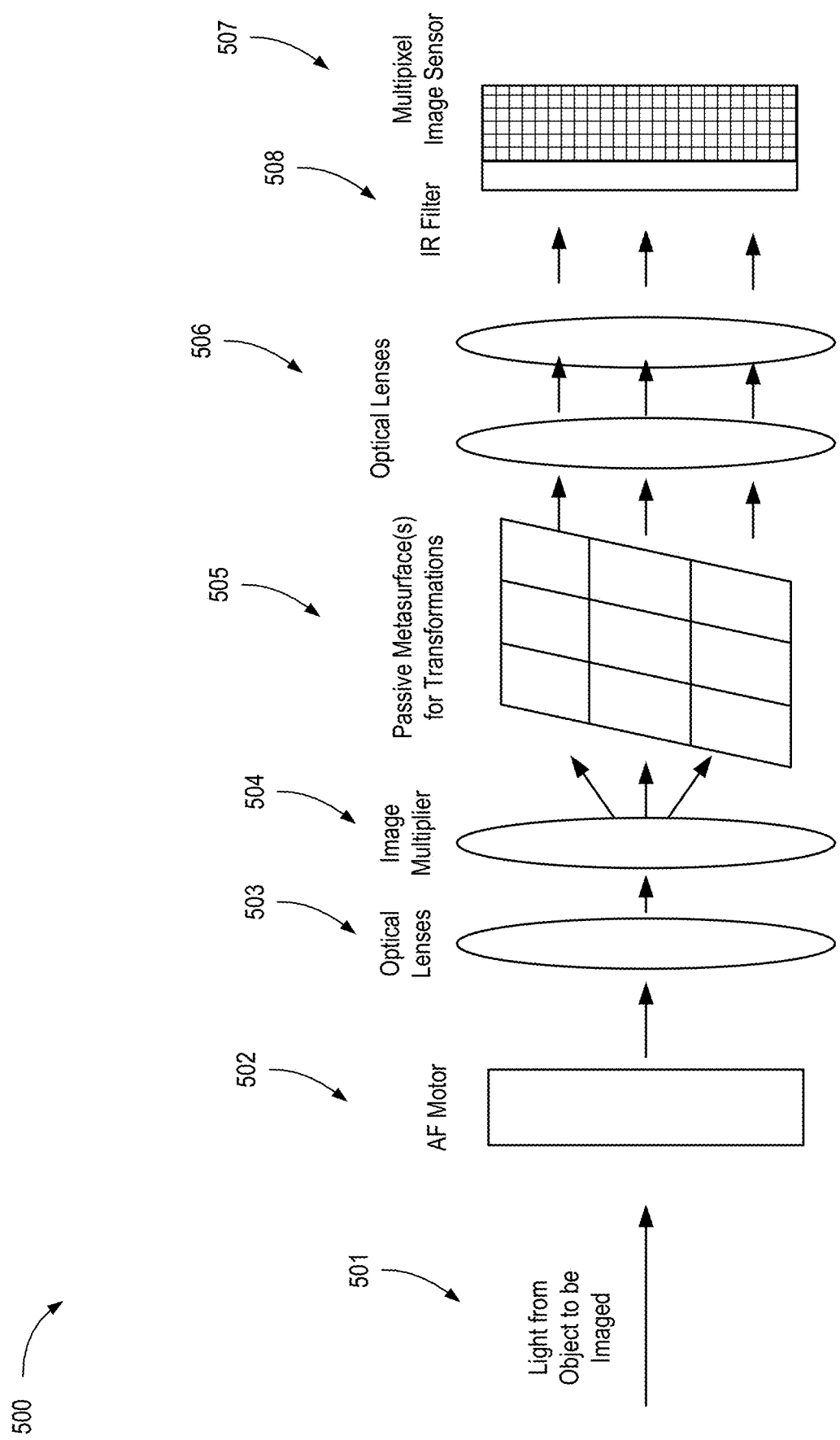
FIG. 5A illustrates another block diagram of an optical system for image processing using a passive metasurface filter, according to one embodiment.

FIG. 5A illustrates another block diagram of an optical detection system 500 for image processing using passive metasurface filters 505, according to one embodiment. As illustrated, the image capture device includes traditional camera components, such as an autofocus motor 502, various optical lenses of an optical subsystem 503, an infrared filter 508, and a multipixel imaging sensor 507 (e.g., a CMOS sensor). A set or array of passive metasurfaces 505 is incorporated into the optical path of the image capture device.

An optical subsystem includes lenses 503 and an image multiplier 504 (e.g., a microlens array or other multiplier) that operates to copy or multiply the optical radiation associated with the original image plane of the light 501 from the object to be imaged into nine image copies. One of the image copies may be captured as an original image by a subregion of the multipixel imaging sensor 507, while the other eight copies are transformed by various regions of the metasurfaces 505 and/or discrete and separate metasurfaces 505, which operate to implement mathematical transformations of the image in the optical domain.

In one alternative embodiment, all copies of the image are transformed by a metasurface 505 such that an original image is not captured at all. In some embodiments, as described herein, the passive metasurface 505, regions of the metasurface 505, and/or discrete metasurfaces 505 may be replaced by non-metasurface optical filters and/or masks. The filtered or transformed image copies are directed by optical lenses 506 through the IR filter 508 for detection by the multipixel image sensor 507. In some embodiments, the IR filter 508 may be omitted. In some embodiments, the optical lenses 506 may be omitted, and the metasurfaces 505 may operate to transform and direct (e.g., deflect, focus, defocus, flatten, etc.) the transformed or filtered image copies onto the sensor 507.

Figure 5B:
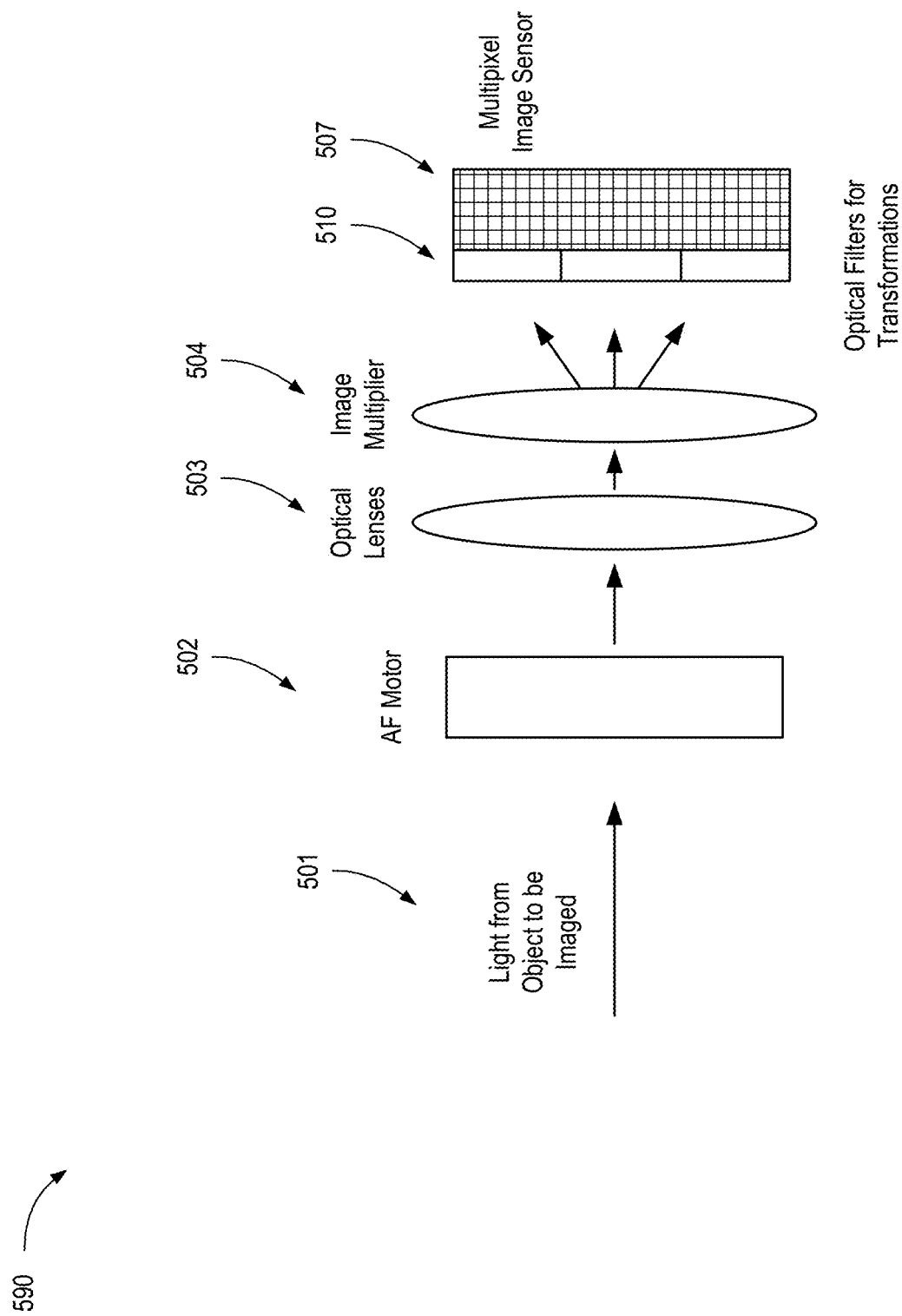
FIG. 5B illustrates another block diagram of an optical system for image processing using a passive metasurface filter directly on an image sensor, according to one embodiment.

FIG. 5B illustrates another block diagram of an optical system 590 for image processing using optical filters 510 directly on an image sensor 507, according to one embodiment. As illustrated, the image capture device includes traditional camera components, such as an autofocus motor 502, various optical lenses of an optical subsystem 503, and a multipixel imaging sensor 507 (e.g., a CMOS sensor). A set or array of optical filters 510 is incorporated directly on the multipixel imaging sensor 507. The optical subsystem includes lenses 503 and an image multiplier 504 (e.g., a microlens array or other multiplier) that operates to copy or multiply the optical radiation associated with the original image plane of the light 501 from the object to be imaged into nine image copies.

In some embodiments, one of the image copies may be captured as an original image by a subregion of the multipixel imaging sensor 507, while the other eight copies are transformed by various optical filters 510, which operate to implement mathematical transformations of the image in the optical domain. In one alternative embodiment, all copies of the image are transformed by an optical filter 510 such that an original image is not captured at all. As previously described, the optical filters 510 may be binary optical filters, optical filter masks, metasurface optical filters, and/or other optical filters for performing transformation operations in the optical domain prior to image capture by the image sensor 507.

Figure 6:
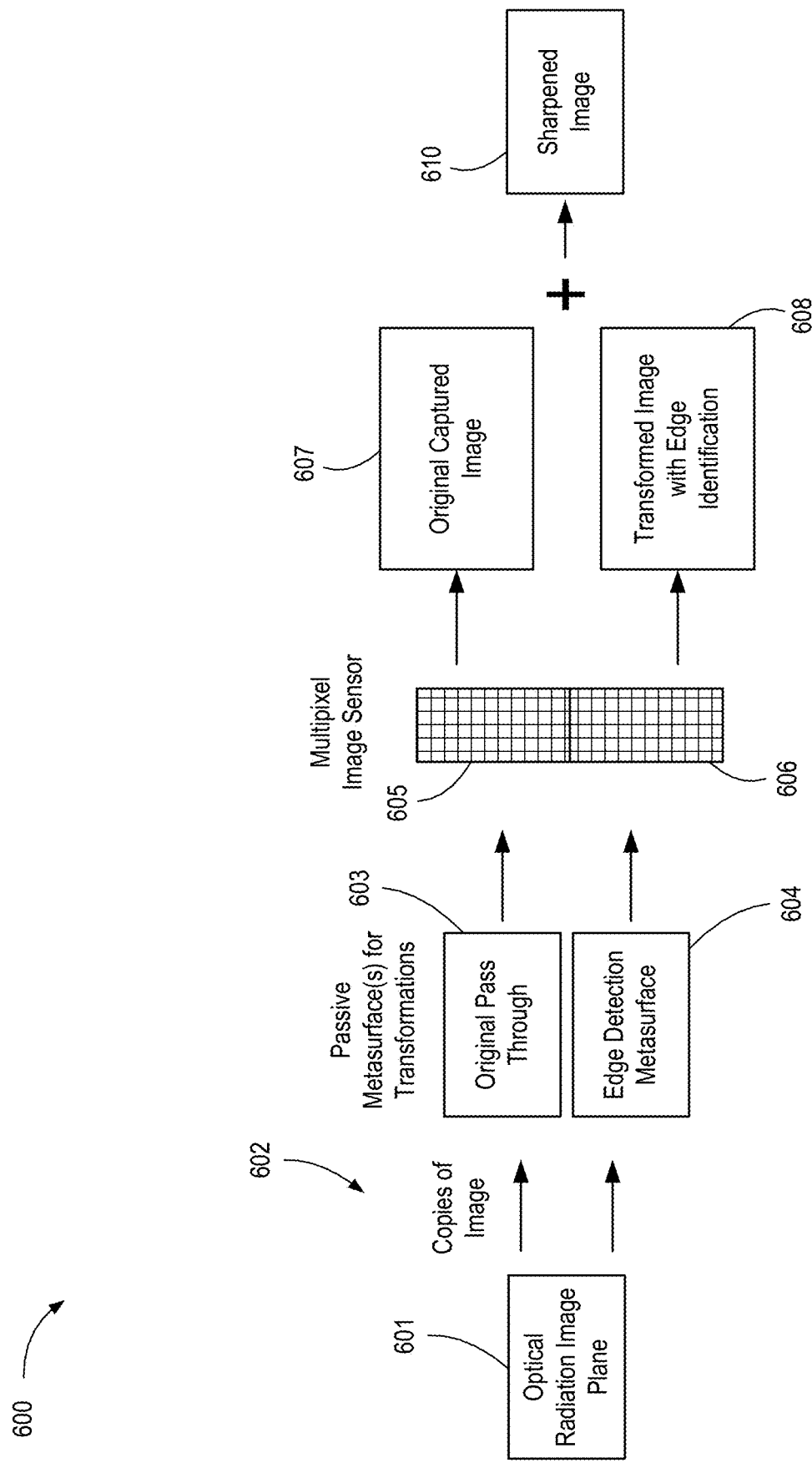
FIG. 6 illustrates a block diagram of a process for sharpening an image using an optical system with a single passive metasurface, according to one embodiment.

FIG. 6 illustrates a block diagram of a process for sharpening an image using an optical system 600 with a single passive metasurface 604, according to one embodiment. As illustrated, two copies 602 of the optical radiation forming an image plane 601 are generated by an optical assembly (e.g., lenses, prisms, mirrors, etc.). One of the image copies 602 is passed through directly, at 603, to the top half of the multipixel image sensor 605. The other image copy 602 is filtered or processed through a metasurface 604 that operates to generate a transformed image corresponding to the optical equivalent of a mathematically computed edge detection algorithm (e.g., a high-pass spatial filter transformation). The transformed image copy is detected by the bottom half of the multipixel image sensor 606. Once captured, the original image 607 and the transformed image with edge identification 608 can be added together to generate a sharpened image 610. This configuration achieves real-time image sharpening with minimal computational load, leveraging optical preprocessing to enhance efficiency in applications requiring low latency and high image clarity.

Figure 7A:
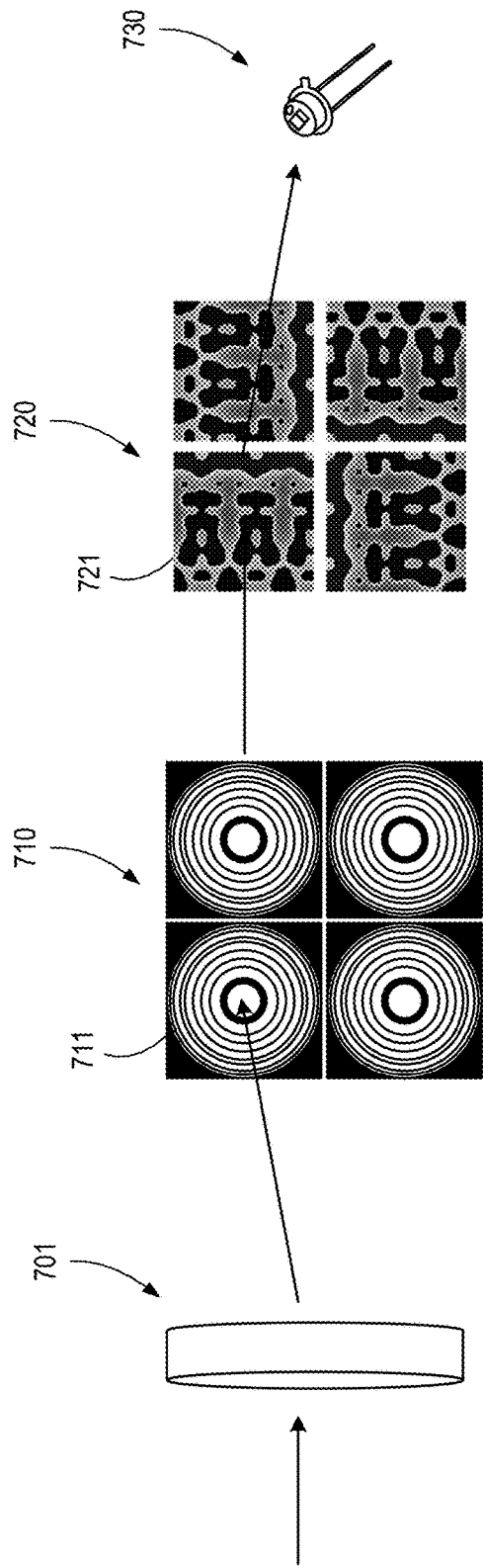
FIG. 7A illustrates an example architecture of a detection system with multiple metasurface filters and a single sensor, according to one embodiment.

FIG. 7A illustrates an example architecture of a detection system with multiple metasurface filters and a single sensor, according to one embodiment. Optical radiation received by the imaging optics 701 can be referred to as an image or frame. In traditional approaches, the image might be captured using a multipixel CMOS or CCD sensor, after which the captured image is processed to detect one or more features. The presently described systems and methods avoid the traditional image capture and processing requirements. Instead, as illustrated, the image is split into an M×N array of image copies 710, where M and N are integer values, and a 2×2 array is shown as an example. Each image copy, such as image copy 711, is received by a different metasurface optical filter (e.g., a 2×2 array 720 of metasurface optical filters are shown). Each metasurface optical filter operates to convolve the image copy with a predefined filter pattern, such as filter pattern 721, corresponding to a feature of interest. The combined optical radiation output by the array 720 of metasurface optical filters is received by the single photodiode 730.

Figure 7B:
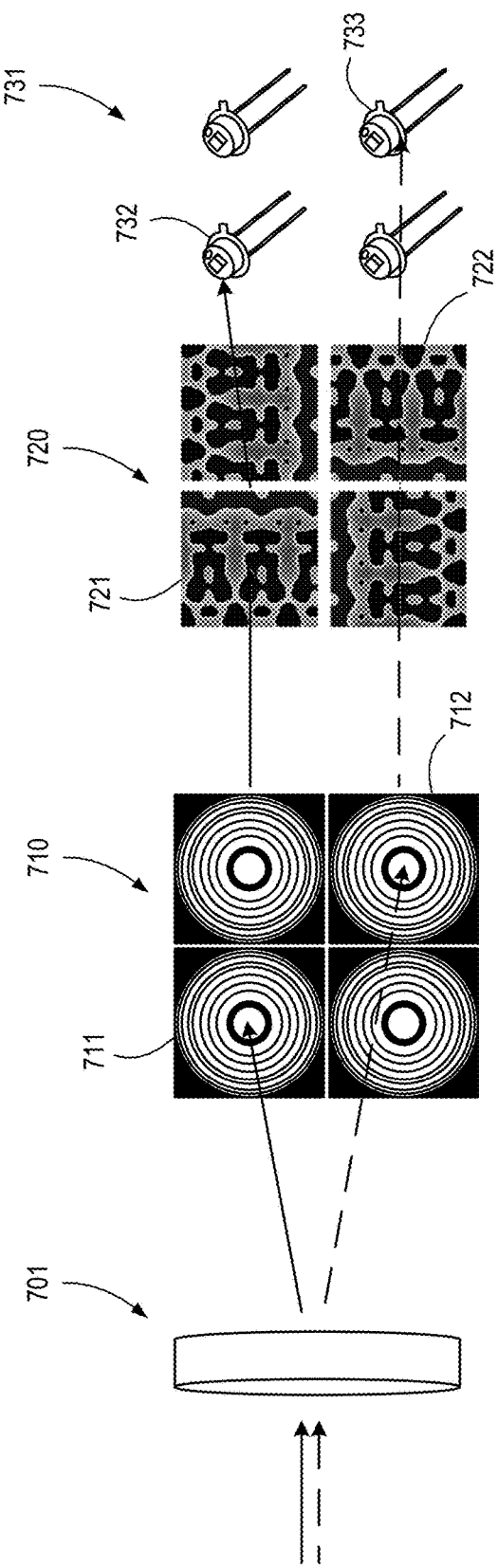
FIG. 7B illustrates an example architecture of a detection system with multiple metasurface filters and multiple sensors, according to one embodiment.

FIG. 7B illustrates an example architecture of a detection system with multiple metasurface filters and multiple sensors 731, according to one embodiment. Again, optical radiation received by the imaging optics 701 can be referred to as an image or frame. Again, the image is split into an M×N array of image copies 710, including image copy 711 and image copy 712, where M and N are integer values. An example 2×2 array of image copies 710 is shown, but it is appreciated that more or fewer image copies are possible with a corresponding number of metasurface optical filters.

Each metasurface optical filter, including metasurface optical filter 721 and metasurface optical filter 722, operates to convolve one of the image copies 710 with a predefined filter pattern corresponding to a feature of interest. The output of each metasurface optical filter 720 is received by a unique photodetector 731 that is isolated or independent from the others. Specifically, the image copy 711 is filtered through metasurface optical filter 721 before being received by detector 732. Similarly, the image copy 712 is filtered through metasurface optical filter 722 before being received by detector 733.

FIG. 8A illustrates the example detection system of FIG. 7A configured to recognize hand gestures, according to one embodiment. The intensity of the optical radiation output by each metasurface optical filter 810 corresponds to the presence or absence of the particular hand gesture 820. For example, the optical filter 811 corresponds to the hand gesture 821. The light from each of the metasurface optical filters is directed to the photodiode 830. If none of the hand gestures 820 are present in the image, then the combined intensity of the optical radiation received by the photodiode 830 is relatively low, and the system indicates that none of the features of interest (the hand gestures 820) are present in the image. However, if one or more of the hand gestures 820 is present in the image, then the combined intensity of the optical radiation output by the array of metasurface optical filters 810 exceeds a threshold value, and the system indicates that one or more of the features of interest (the hand gestures 820) is present in the image.

FIG. 8B illustrates the example detection system of FIG. 7B configured to recognize and distinguish between various hand gestures 820, according to one embodiment. Each metasurface optical filter 810 is associated with a unique hand gesture 820. For example, the optical filter 811 corresponds to the open palm hand gesture 821, while the optical filter 812 corresponds to the closed fist hand gesture 822. The optical radiation from each optical filter 810 is detected by a discrete detector 831. For example, the optical radiation from the optical filter 811 is received by the detector 832 to detect the hand gesture 821. The optical radiation from the optical filter 812 is received by the detector 833 to detect the closed fist hand gesture 822.

The intensity of the optical radiation detected by each photodiode 831 corresponds directly with the confidence level that a particular hand gesture 820 is present in the image. A detection subsystem (circuitry, such as comparators) may generate a plurality of binary signals, where each binary signal indicates the presence or absence of a given hand gesture 820 (or other feature of interest) in the image. In some embodiments, a more complex detection subsystem may be used to generate a communication signal (in any of a wide variety of protocols) that indicates which features of interest are detected in the image or frame at any given time. As previously noted, optical filters or masks other than metasurface optical filters may be used in place of or in addition to the metasurface optical filters 720 and 810 described in FIGS. 7A-8B.

Figure 9:
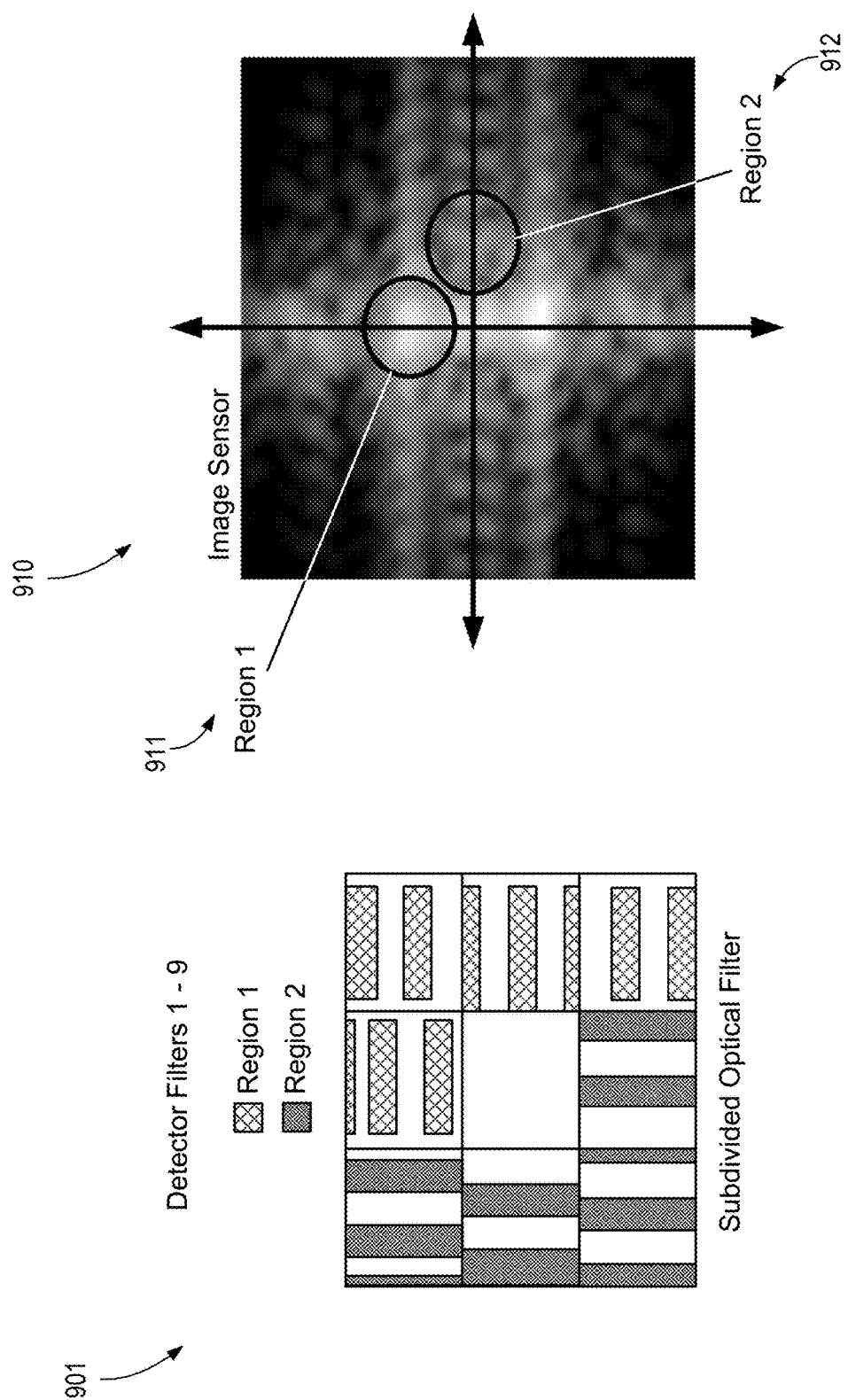
FIG. 9 illustrates a balanced detector configuration for optical filtering, with an image sensor subdivided into two primary regions, according to one embodiment.

FIG. 9 illustrates a balanced detector configuration for optical filtering, with an image sensor 910 subdivided into two primary regions, a first region 911 and a second region 912. The optical filter 901 is subdivided into a set of nine different optical filters. A first subset of the optical filters convolves incoming optical radiation and directs the convolved optical radiation into the first region 911 on the image sensor 910. A second subset of the optical filters convolves incoming optical radiation and directs the convolved optical radiation into the second region 912 on the image sensor 910. The system compares the intensity or other characteristics of the optical radiation detected with the first region 911 and the second region 912.

This configuration facilitates balancing by evaluating the variance in total image intensity for each mask within the first region 911 and the second region 912. The system produces a normalized signal output by analyzing the relative intensity variance across the filters in these regions, enhancing detection accuracy, especially under fluctuating lighting conditions.

Figure 10:
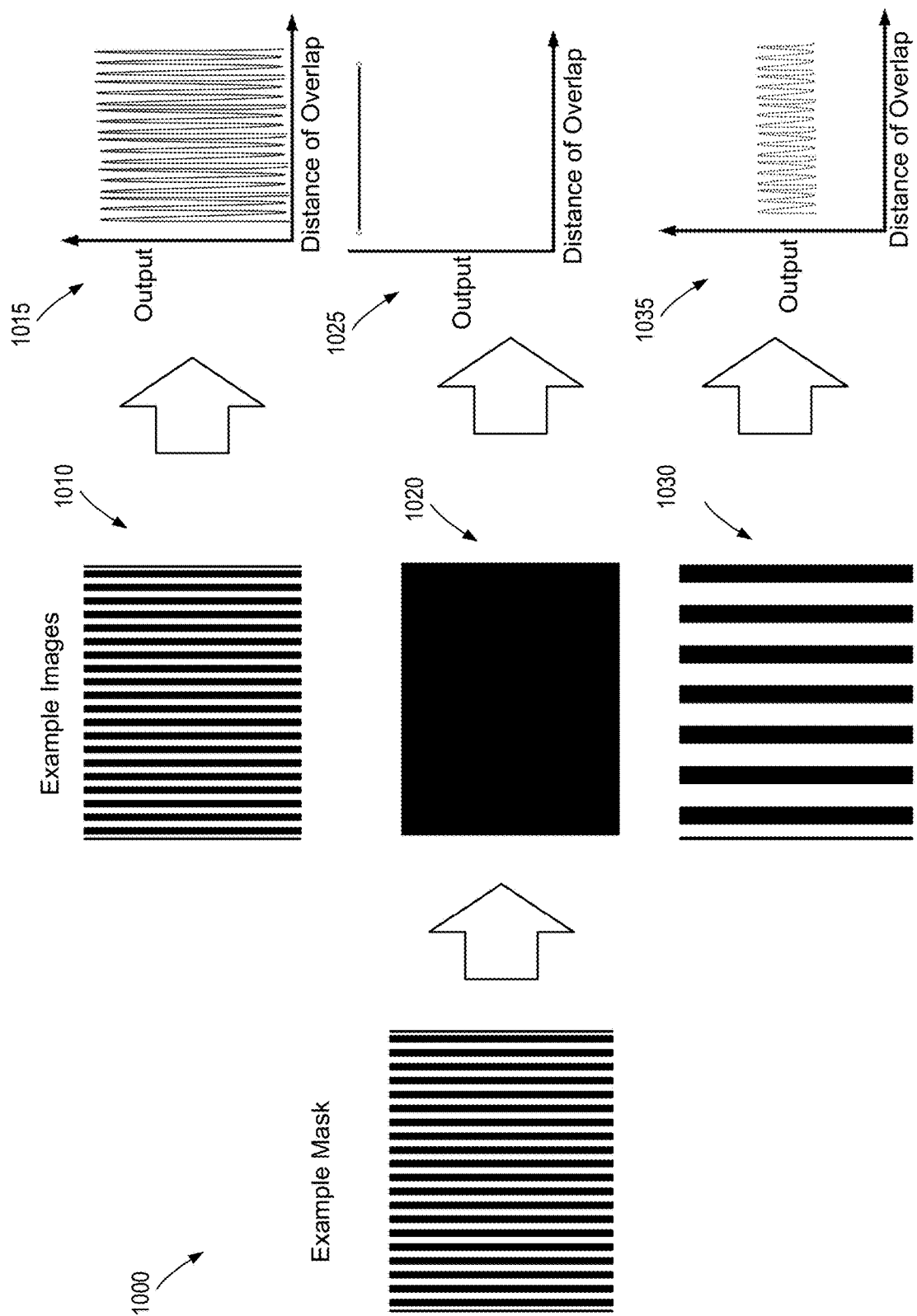
FIG. 10 demonstrates the impact of shifting an example mask over various images to measure changes in output intensity, according to one embodiment.

FIG. 10 demonstrates the impact of shifting an example mask 1000, represented by a bar pattern, over various images to measure changes in output intensity. The center set of images includes a first image 1010 with a first spatial pattern of vertical lines, a second image 1020 as a solid-filled region, and a third image, 1030, with a different spatial pattern of vertical lines. The first graph 1015 illustrates the convolution of the mask 1000 with the first image 1010 as the first image 1010 is shifted horizontally relative to the mask 1000. Large swings in intensity correspond to the phase shift in alignment between the mask 1000 and the features (vertical bars with the first spatial frequency) of the first image 1010. The large swings in intensity indicate that the vertical bars of the first image 1010 are similar in spatial frequency to the mask 1000.

The second graph 1025 illustrates the convolution of the mask 1000 with the second image 1020 as the second image 1020 is shifted horizontally relative to the mask 1000. Notably, the intensity remains constant in graph 1025 because the image is a solid-filled area. The third graph 1035 illustrates the convolution of the mask 1000 with the third image 1030 as the third image 1030 is shifted horizontally relative to the mask 1000. Small swings in intensity correspond to the phase shift in alignment between the mask 1000 and the features (vertical bars with the second spatial frequency) of the third image 1030. The relatively small swings in intensity indicate that the vertical bars of the third image 1030 are dissimilar in spatial frequency to the mask 1000.

The graphs 1015, 1025, and 1035 plot the sum of image intensity across all pixels in each image copy, showing how brightness fluctuates as the mask's phase aligns or misaligns with the image pattern. When the image frequency closely matches the mask (e.g., graph 1015), large amplitude variations occur, creating high peaks and valleys in intensity. In contrast, for an off-frequency pattern (graph 1035), the fluctuations are smaller, and with a solid image (graph 1025), no significant intensity changes are observed. In some embodiments, the system may utilize this approach to detect frequency resonance, where alignment results in pronounced intensity modulation and highlights how different image patterns respond to mask shifts, thereby identifying specific spatial features based on modulation characteristics.

Figure 11:
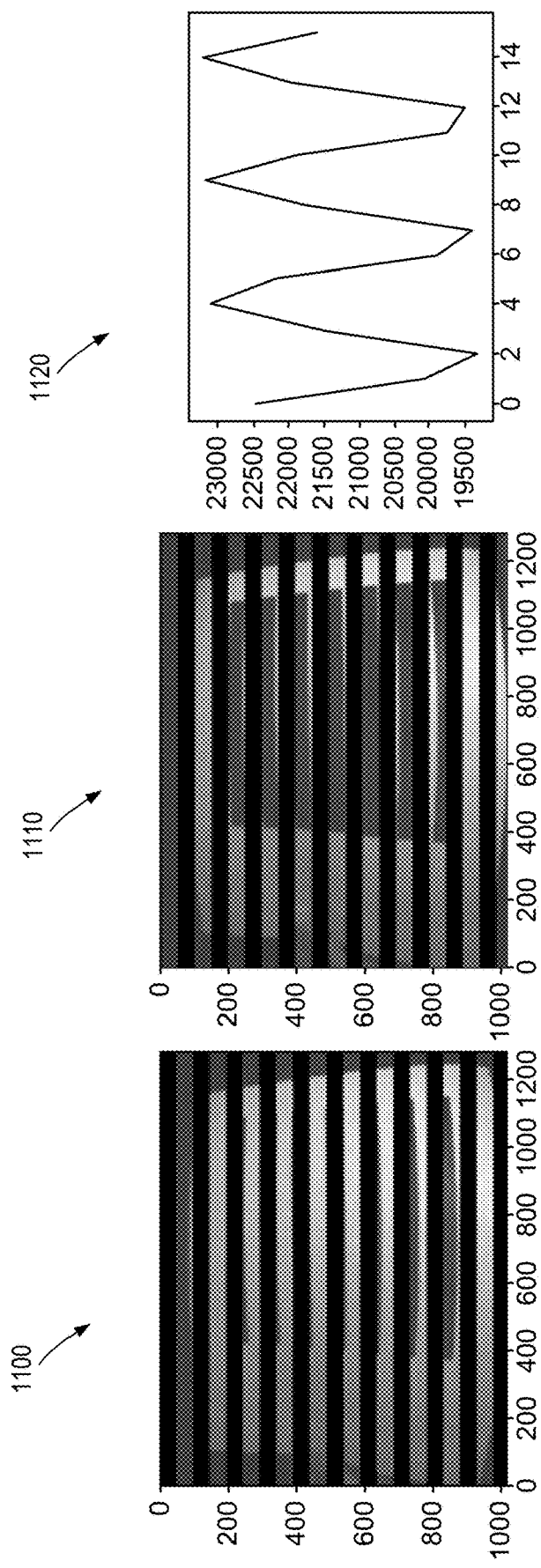
FIG. 11 illustrates spatial filtering to analyze specific patterns within an image, according to one embodiment.

FIG. 11 illustrates spatial filtering to analyze specific patterns within an image, according to one embodiment. In the first diagram 1100, the horizontal black bars of the filter are spatially aligned (e.g., in phase) with the horizontal bars of the underlying image, resulting in a relatively low output detection signal. In the second diagram 1110, the horizontal black bars of the filter are misaligned (e.g., 180 degrees out of phase) with respect to the horizontal bars of the underlying image, resulting in a relatively high output detection signal.

As the image is shifted vertically relative to the mask, the detected intensity will vary according to the ratio of the spatial overlap between the mask and the underlying image. The system may measure the output intensity, which is shown in the graph 1120, as the mask is shifted across the image (or vice versa). The system can use the extend of modulation of the measured output intensity signal to capture and analyze spatial frequency information, effectively isolating specific orientations or structural elements within the scene.

This approach enables the detection system to discern subtle features based on frequency alignment, enhancing pattern recognition and orientation detection even in varying lighting conditions and with negligible compute operations. By analyzing the modulations in intensity, as shown in the graph 1120, the system can dynamically adjust to changes and identify critical features based on the spatial characteristics highlighted by the mask. The system may utilize multiple optical filters (masks) to analyze and identify various features of the image, such as spatial frequencies, specific features or patterns, color tone(s), spectral reflectivity, polarization response, intensity, temperature, and/or other characteristics. The detected features may be digitally analyzed to determine if a particular object or feature of interest has been detected within the image alone or in combination with other features. Nearly all the processing is done optically, and the digital analysis may, for example, merely be a comparison of a handful of binary or analog intensity determinations from each of a plurality of optical filters.

Figure 12A:
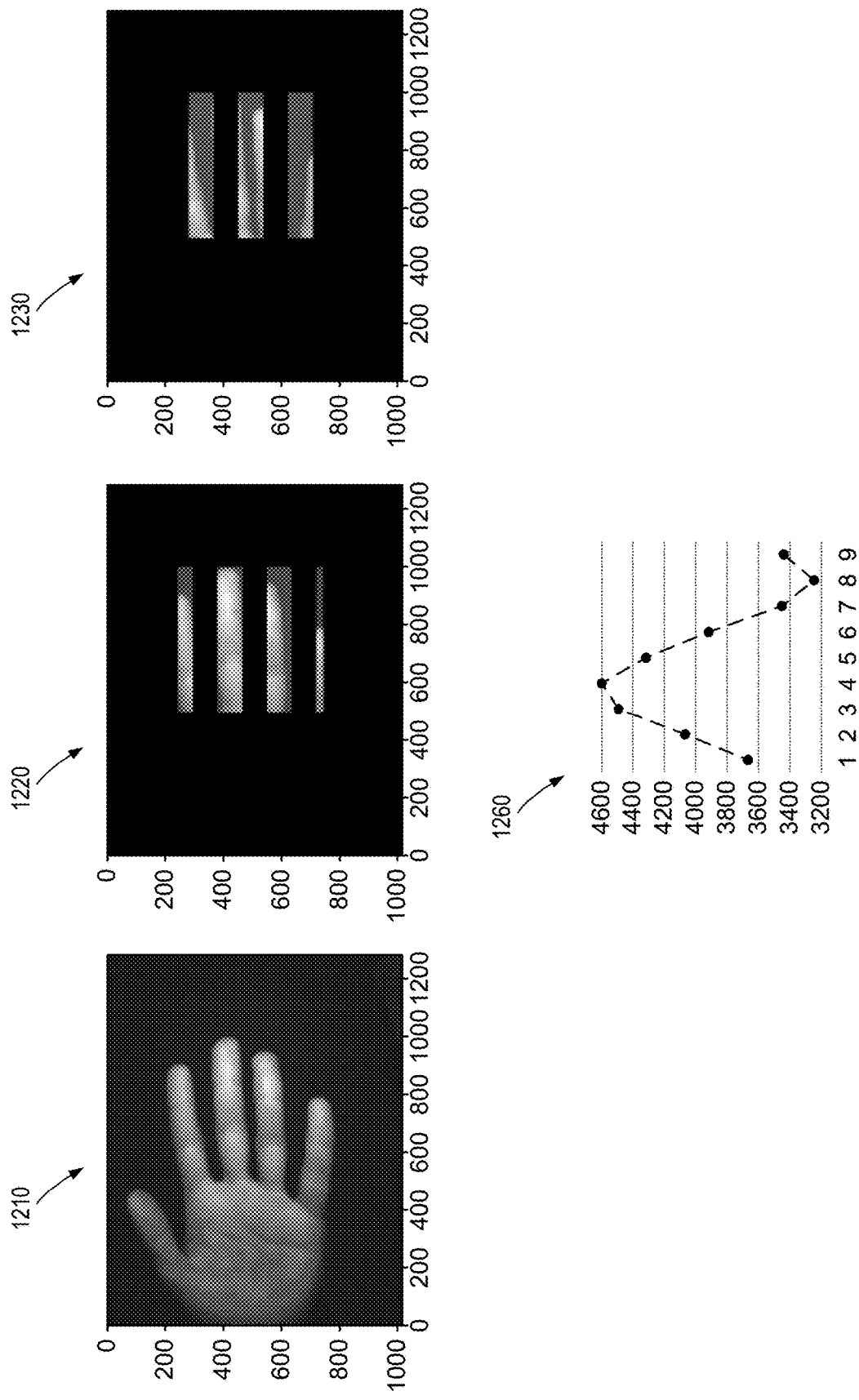
FIG. 12A illustrates a detection system that uses spatial filtering to detect the alignment and orientation of features in an image, according to one embodiment.

FIG. 12A illustrates a detection system that uses spatial filtering to detect the alignment and orientation of features in an image by applying a mask with specific spatial frequency characteristics. In the first image 1210, the user's hand is positioned with fingers spread horizontally. The second image 1220 shows this same hand with an applied mask consisting of a series of horizontal bars. In this configuration, the fingers of the hand are spatially aligned within the gaps of the horizontal bars, resulting in higher modulation of the output signal. This alignment between the hand and the mask maximizes the spatial frequency match, allowing light to reflect off the fingers and pass through the gaps in the mask (optical filter) where the fingers are located.

In the third image 1230, the hand has been shifted vertically relative to the mask. This misalignment causes the fingers to intersect the solid portions of the horizontal bars, thereby reducing the amount of light that is reflected by the fingers through the mask for detection by the sensor, thereby producing a lower output intensity. The system can dynamically detect spatial frequency changes by observing the variations in alignment between the image features (in this case, the fingers) and the mask pattern. In various embodiments, the system may evaluate the extent of modulation that is in phase with the target frequency (as opposed to the absolute intensity) to normalize the for varying brightness conditions (e.g., ambient light changes).

As the image of the hand is shifted relative to the mask, the system detects corresponding changes in output intensity, which are captured in the graph 1260. The graph 1260 shows a waveform representing intensity modulation as the hand moves relative to the horizontal bars of the filter. Peaks on the graph indicate phases of alignment between the fingers and the gaps in the bars, while valleys represent misaligned phases where fingers intersect the bars, blocking light. This oscillation in intensity allows the detection system to precisely measure spatial frequency alignment, enhancing the system's ability to detect orientation and movement based on spatial pattern recognition.

This optical computation approach is particularly useful in applications requiring low-power, high-speed detection of feature orientation, as the intensity variations provide immediate and low-cost feedback on the position and alignment of image features relative to the mask. Through this approach, the detection system leverages simple optical filtering techniques to achieve real-time, responsive analysis of spatial frequencies that can be used for gesture recognition, object tracking, and pattern detection, when combined with memory storage and post-capture comparison of sequential feature detections.

Figure 12B:
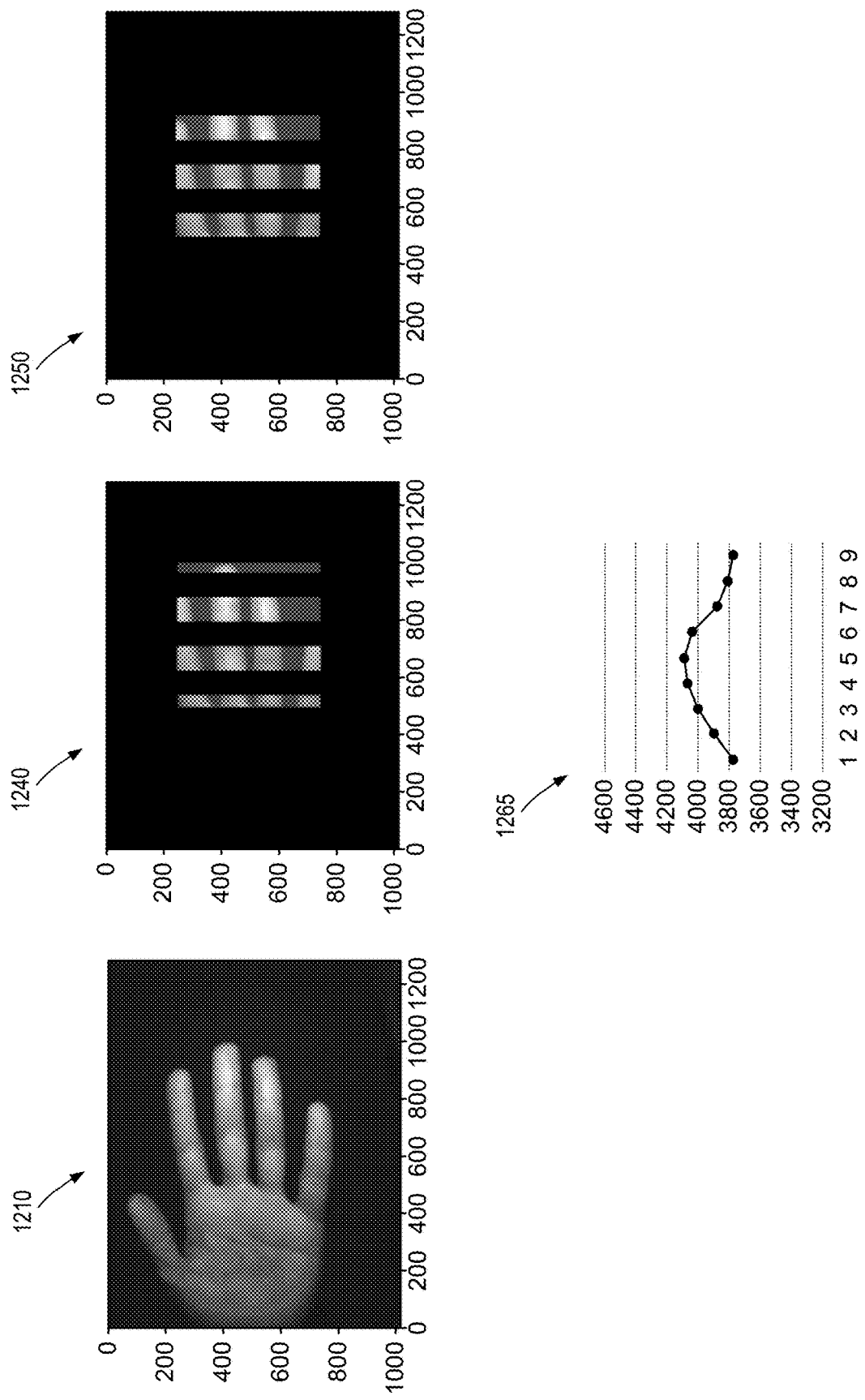
FIG. 12B illustrates a detection system similar to that shown in FIG. 12A but with an alternative mask configuration, according to one embodiment.

FIG. 12B illustrates a detection system similar to that shown in FIG. 12A but with an alternative mask configuration, according to one embodiment. The first image 1210 shows the user's hand positioned with fingers spread horizontally, as in FIG. 12A. However, in this case, the second image 1240 demonstrates the application of a mask comprising vertical bars that are oriented perpendicularly to the fingers of the hand. This perpendicular alignment means that the fingers are consistently intersected by the vertical bars, regardless of minor shifts in the image position relative to the mask.

Due to the vertical alignment of the mask relative to the horizontally positioned fingers, there is minimal spatial frequency alignment between the mask and the hand's features. As a result, the output intensity remains relatively constant even as the mask is shifted horizontally across the hand image. This lack of alignment is represented in the graph 1265, which shows relatively minor intensity variations as the mask and fingers are shifted horizontally with respect to one another. The consistent intensity levels suggest that the vertical bar mask does not experience significant modulation when applied to horizontal features like the fingers.

A system may, for example, utilize the horizontal masks in the images 1220 and 1230 and the vertical masks in the images 1240 and 1250 to detect the orientation of a hand based on the spatial alignment of the fingers with one mask or the other. It is appreciated that this simple example of horizontal or vertical alignment of bars can be extended to any number of other features (spatial or otherwise) for the detection of any of a wide variety of objects or object features, including orientations, movement, translations, and the like. A selection of masks or optical filters can be employed to detect specific spatial frequencies or other distinguishing features, allowing the system to be used flexibly for object recognition, gesture tracking, orientation detection, and more, when combined with memory storage and post-capture comparison of sequential feature detections.

Figure 13A:
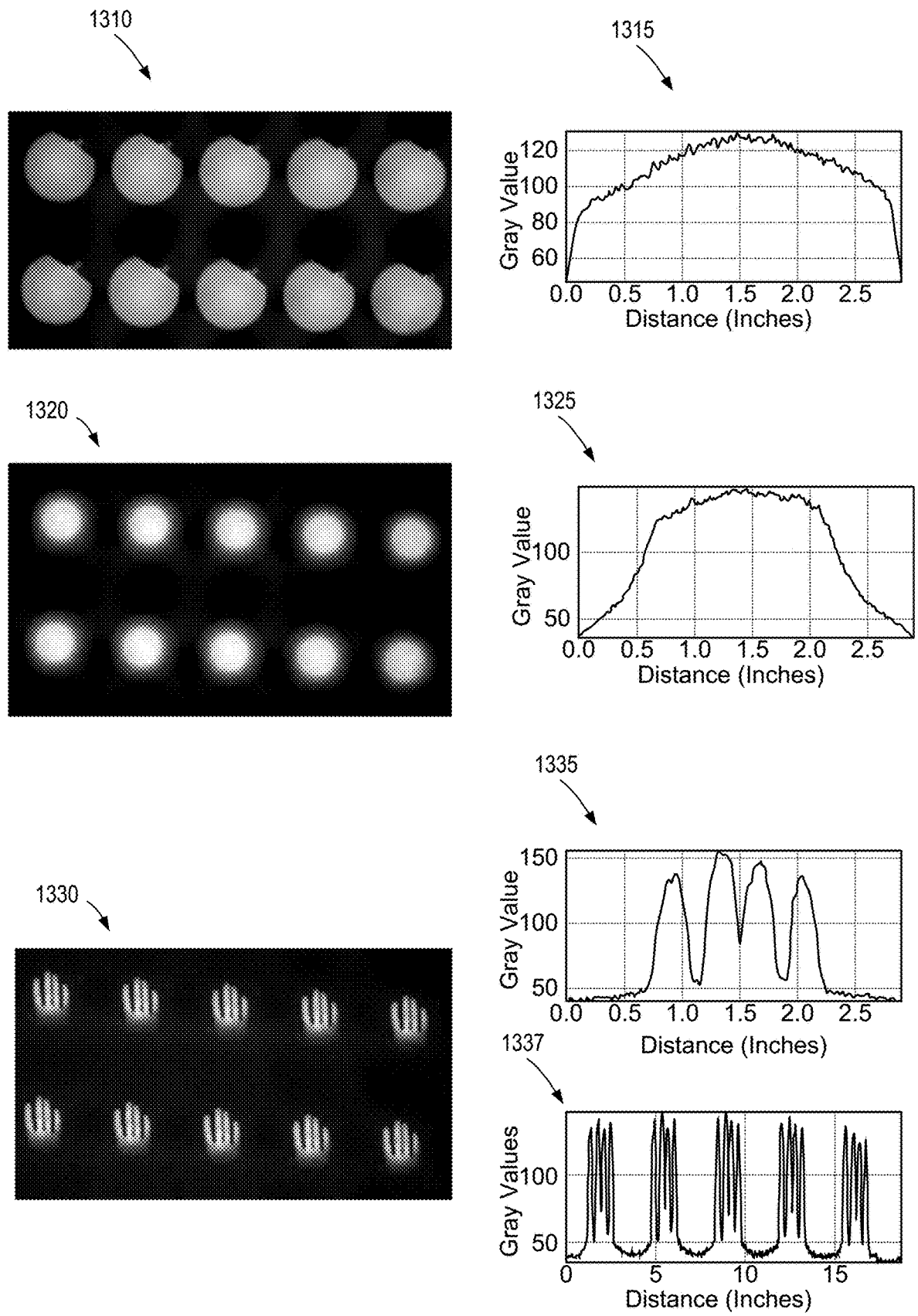
FIGS. 13A and 13B illustrate the application of a Gaussian transmission filter to a set of duplicate images produced by a microlens array, according to one embodiment.
Figure 13B:
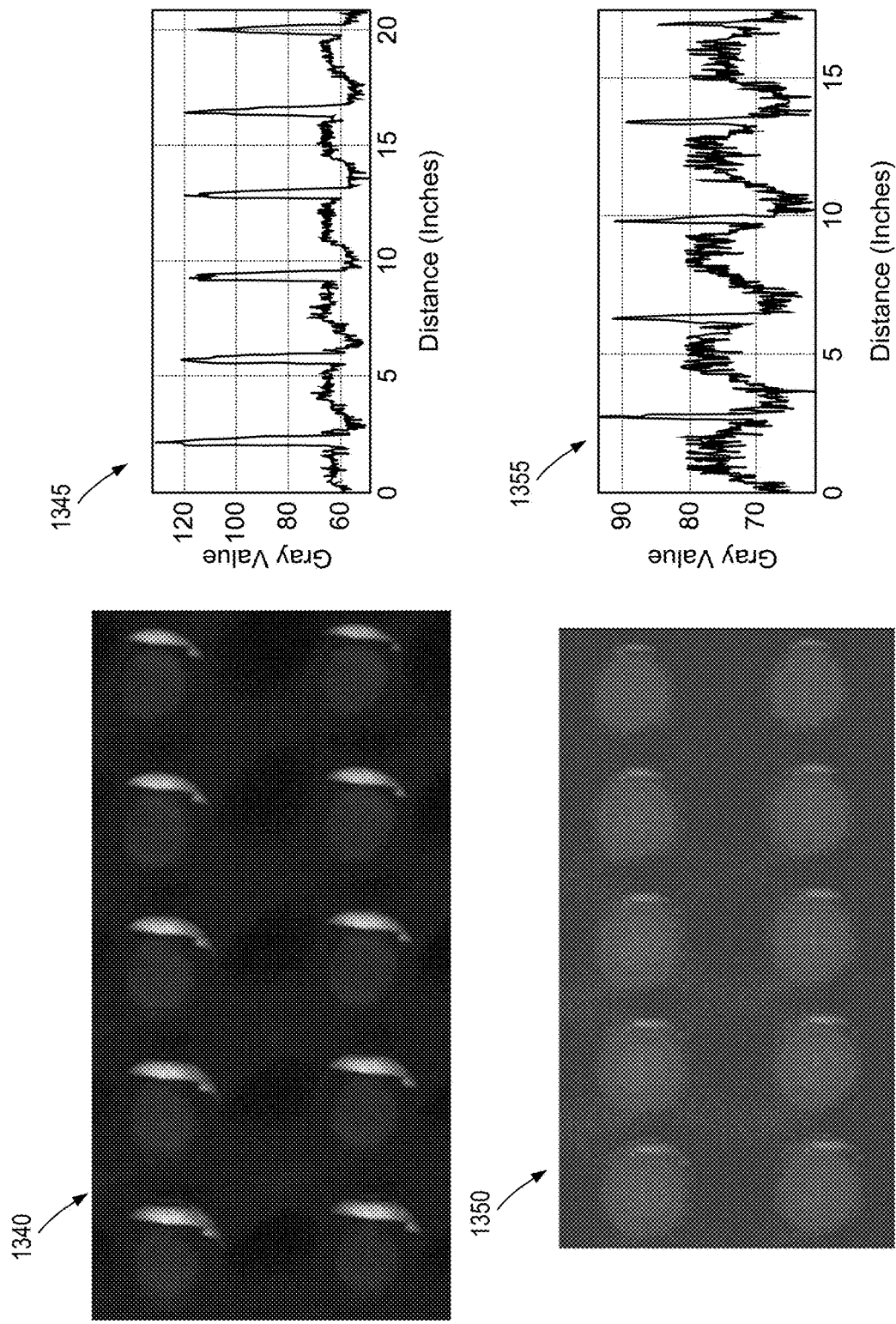

FIGS. 13A and 13B illustrate the effects of applying a Gaussian transmission filter, or apodizer, to a set of duplicate images produced by a microlens array or other optical replication systems. In FIG. 13A, image 1310 displays ten unmodified duplicate images of a scene, each capturing slightly different fields of view. This variation arises because each duplicate image is captured from a slightly different angle, resulting in inconsistent content at the image edges. Graph 1315 plots the distribution of gray values relative to distance for one of these unmodified images. Variations can occur when, for example, an object's edge (such as a hand) may be visible in one of the duplicate images but not another, thereby introducing inconsistencies in optical processing. The apodizer focuses the detection operations toward the center of the frame so that an object entering the frame from an edge does undermine the detection process.

The image 1320 shows the duplicated images after applying a Gaussian transmission filter, which attenuates brightness toward the edges, effectively cropping each image toward its center. Graph 1325 illustrates the distribution of gray values for one of the Gaussian-cropped images, displaying a smoother, more normalized pattern that is center-focused, which helps to ensure consistent optical processing.

In image 1330, a hand with fingers extended vertically is replicated ten times after applying the Gaussian filter. Graph 1335 shows the gray values for one image, where the peaks correspond to the fingers' positions and valleys represent spaces between the fingers. Graph 1337 shows the gray values across a row of five of these duplicate images, revealing a similar pattern of intensity peaks and valleys across each filtered duplicate, indicating consistent image duplication and normalization.

FIG. 13B shows image 1340, in which the edge of a hand is moving into the field of view. The top left duplicate image shows a larger portion of the hand, while the bottom right duplicate image captures less of it. This is reflected in graph 1345, where peak intensity values for each image vary, with higher peaks on the leftmost image and lower peaks toward the right. After Gaussian filtering, shown in image 1350, the brightness across these duplicates is more normalized, reducing the intensity discrepancies across images. Graph 1355, which has a more compressed scale on the vertical axis, demonstrates this effect, showing a reduced variation in peak intensity values for each image in the row, indicating the effectiveness of Gaussian filtering in achieving consistent intensity values across the duplicate images.

Figure 14:
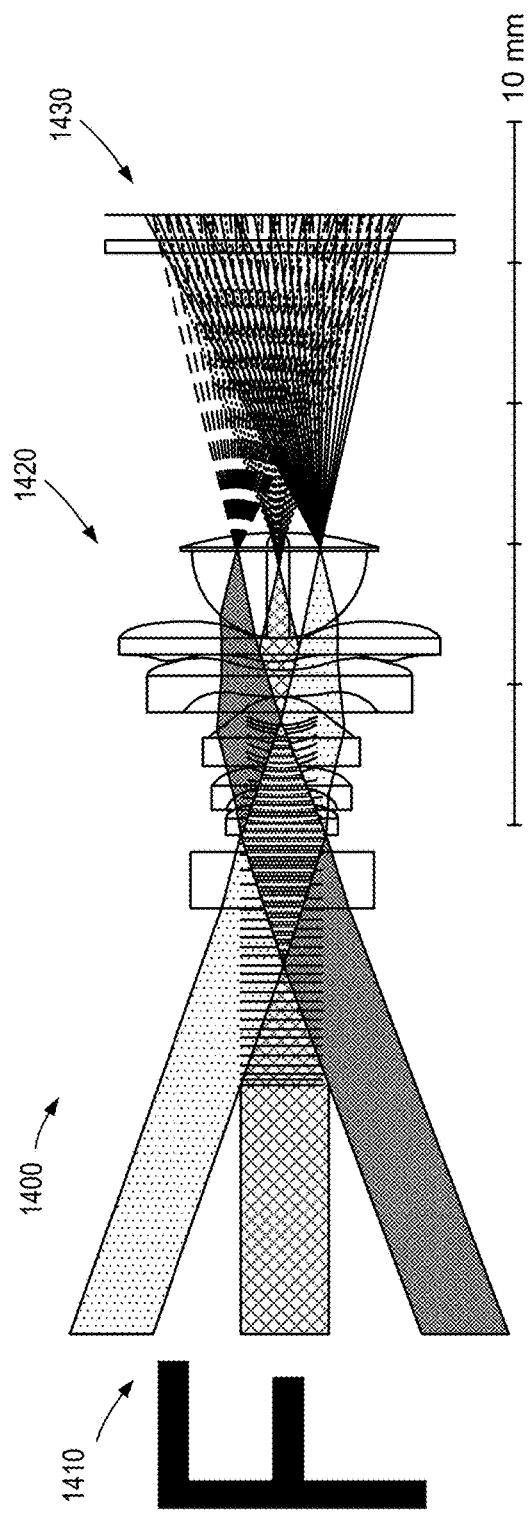
FIG. 14 illustrates an optical image replication subsystem, according to one embodiment.

FIG. 14 illustrates an optical image replication subsystem 1400, in which light 1410 corresponding to an image plane from an object, represented by the letter "F," is processed through optical elements 1420. This optical setup includes a microlens array that functions to replicate the image of the letter "F" multiple times, projecting these copies onto a focal plane 1430. The microlens array creates an array of duplicated images by channeling and focusing portions of the incoming light through each small lens, thereby producing a structured grid of identical images at the focal plane.

Figure 15:
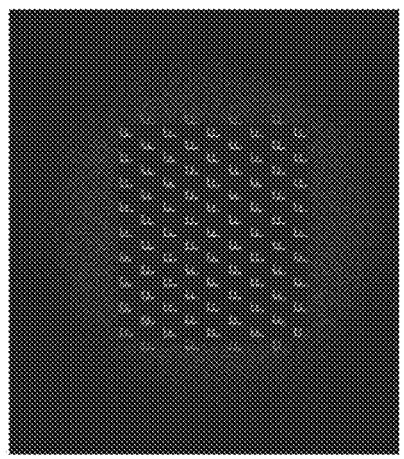
FIG. 15 illustrates the duplicate images generated by the optical image replication subsystem of FIG. 14, according to one embodiment.

FIG. 15 illustrates the duplicated images 1550 of the letter "F," generated through the microlens array in the optical image replication subsystem at the focal plane 1430 in FIG. 14. Each duplicated image maintains the spatial characteristics of the original "F," effectively allowing multiple identical projections that can be further processed for parallel image analysis, feature detection, or spatial filtering.

In some embodiments, a beamsplitter assembly in combination with mirrors or prisms may be used instead of a microlens array or metalens array. The beamsplitter may divide the incoming light from the object's image plane into multiple beams, each directed along different optical paths and reflected onto the focal plane by mirrors or redirected using prisms. In yet another embodiment, a diffractive optical element (DOE) splits and directs light into multiple diffraction orders, resulting in replicated images at specific focal points.

In other embodiments, a single metasurface designed with multiple focal points replicates the image by focusing light at predetermined locations on the focal plane. The metasurface lens, unlike a traditional microlens array, can be engineered to create several simultaneous focal points by adjusting the phase profile across the surface. This approach is particularly useful for miniaturized optical systems where space is limited.

Figure 16:
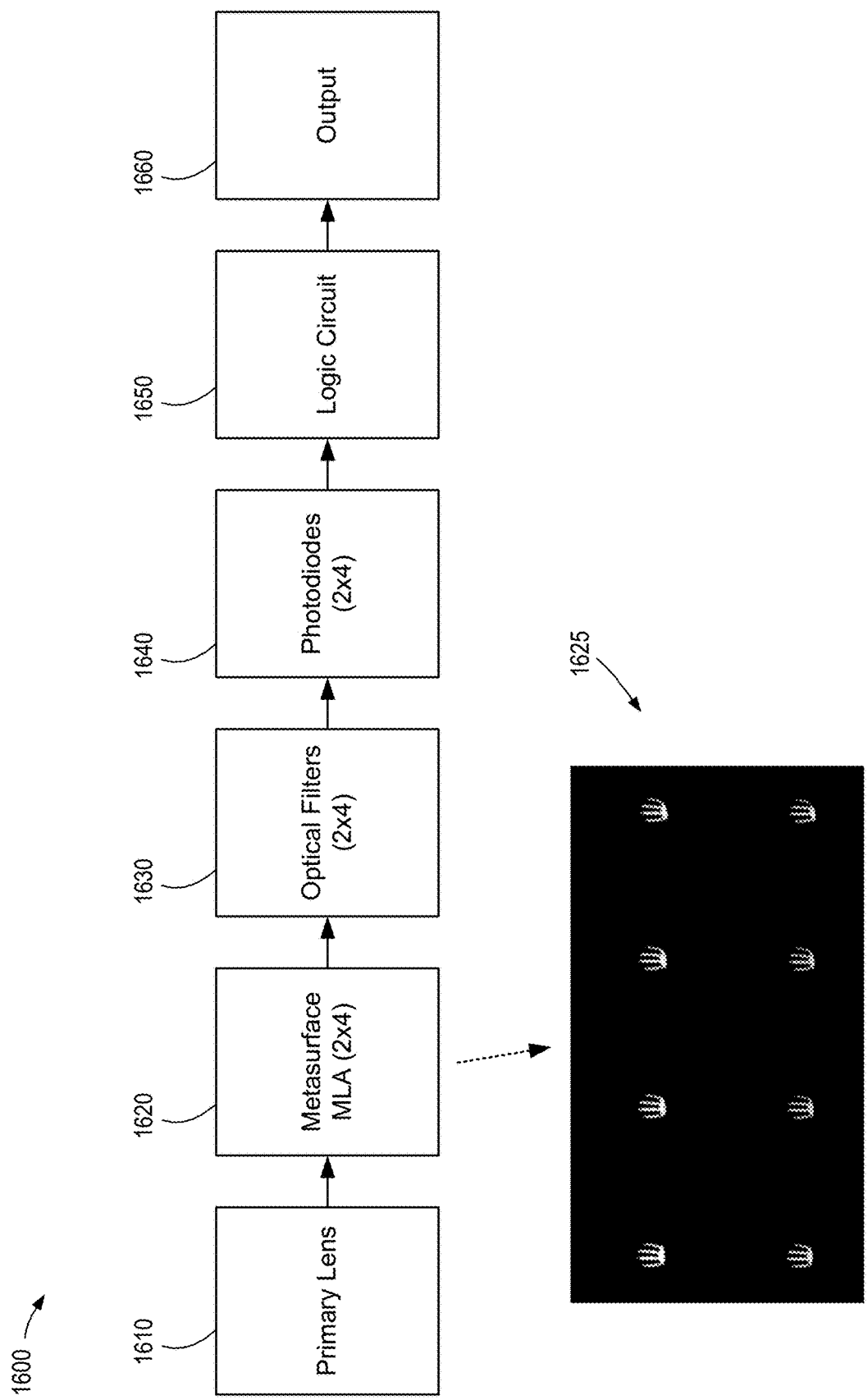
FIG. 16 illustrates a functional block diagram of a detection system, according to one embodiment.

FIG. 16 presents a functional block diagram of a detection system 1600 designed for object recognition and real-time detection via optical processing and without traditional image storage. The system includes a primary lens 1610, which collects light from an object, such as a hand, and directs it toward a metasurface or a 2×4 array of microlenses (MLA) 1620. This metasurface and/or MLA 1620 replicates the image eight times, creating an array of duplicate images 1625, potentially with slight variations based on the microlens structure that may be normalized as described herein.

The duplicated images 1625 are then filtered by a corresponding 2×4 array of optical filters 1630. In some embodiments, one or more of the optical filters 1630 may be tuned to a specific wavelength band, such as infrared, to enhance contrast and/or isolate a target feature. This filtered light is detected by a 2×4 array of photodiodes 1640, which converts the light into electrical signals. The photodiodes work in tandem with the optical filters to identify or detect specific orientations or characteristics of the imaged object based on the filtered wavelengths, spatial frequencies, color tones, etc.

A logic circuit 1650 processes the signals from the photodiodes 1640 in real-time, bypassing the need for image storage or memory. Since the system reads only live output from the photodiodes, there is no frame rate; instead, the system continuously interprets the presence or orientation of the object within the scene. The output 1660 provides immediate, low-power, and low-computational-cost feedback, indicating, for example, the detection of a hand, facial feature, user attention detection, or other object and/or an associated orientation, movement, or other characteristic. This streamlined setup allows the detection system to be highly responsive and inherently secure, as it operates without recording or storing any captured images.

Figure 17:
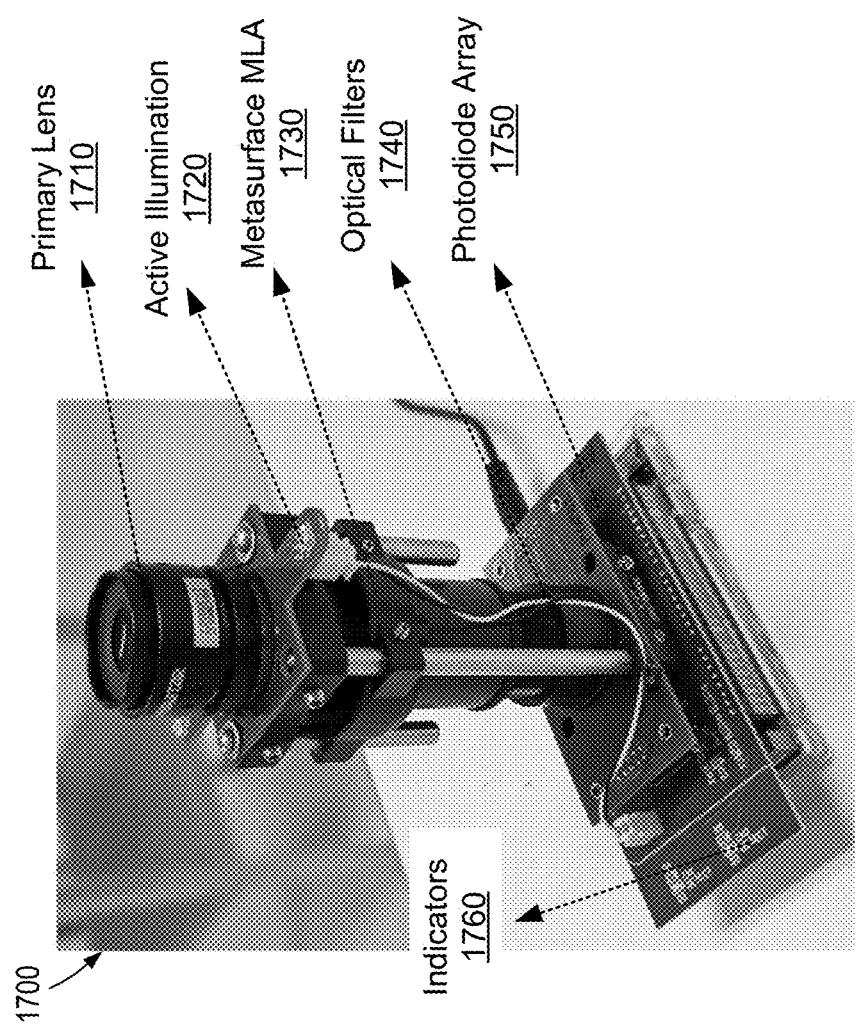
FIG. 17 is a photograph of a working prototype of an example detection system, according to one embodiment.

FIG. 17 provides a photograph of a working prototype of an example detection system 1700, showcasing the integration and functionality of simplified components for live object detection. The system 1700 includes a primary lens 1710, which captures light from the target scene and directs it into the system 1700. To enhance the visibility and contrast of the target object, an active illumination source 1720, such as an infrared (IR) or visible light illumination source, illuminates the scene. This illumination source is particularly effective in enhancing the object's contrast against the background, making features more prominent for detection (referred to as segmentation). In some embodiments, including some embodiments in which metalenses are used as the optical filters, the incoming or input optical radiation comprises coherent optical radiation (e.g., from a coherent illumination source).

The illuminated light then passes through a metasurface or microlens array (MLA) 1730, which creates multiple duplicate images of the object. These images are subsequently processed by an optical filter 1740 to detect specific spatial frequencies, features or patterns, color tone(s), spectral reflectivity, polarization response, intensity, and/or temperature. A photodiode or array of photodiodes 1750 receives the filtered images, converting the incoming light into electronic signals. This real-time signal output is analyzed by the system, and in response to a positive detection, output indicator LEDs 1760 illuminate to signal detection. The LEDs provide instant visual feedback on the presence or orientation of the detected object, validating the system's effectiveness in real-time object recognition applications without image storage, computationally intensive digital processing, or memory dependencies.

In some embodiments, the system may utilize a structured illumination approach, such as a dot matrix pattern. Structured illumination may be used, for example, in applications involving depth measurement and/or three-dimensional feature analysis. Structured illumination may include a grid or dot matrix illumination approach. Detected deformations of the illumination pattern can be used to extract (e.g., through optical filters) depth information, texture information, and/or other surface details of the object.

Figure 18:
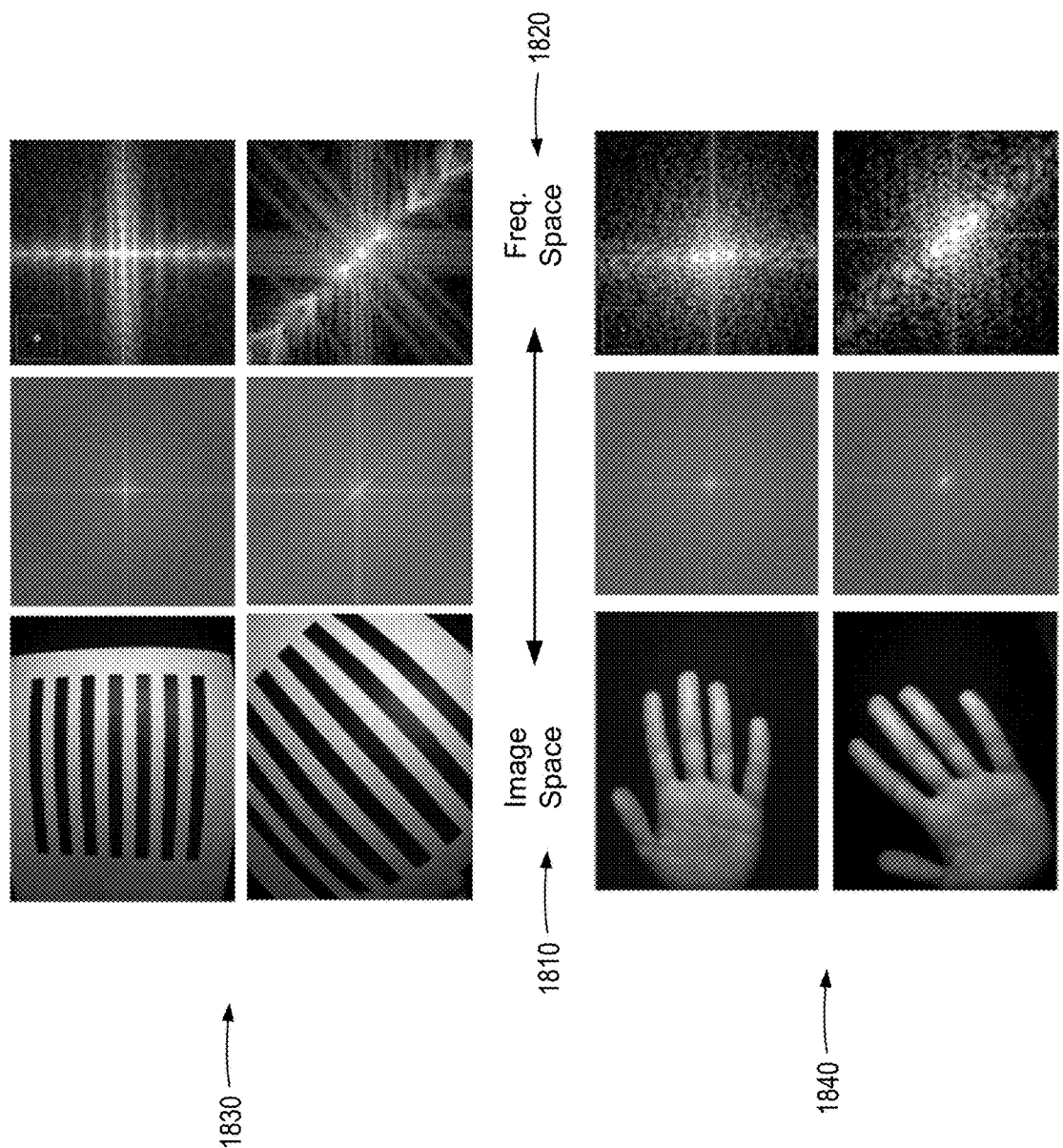
FIG. 18 illustrates a detection method that utilizes image space and frequency space, according to one embodiment.

FIG. 18 illustrates a detection method that utilizes both image space 1810 and frequency space 1820 representations to identify specific spatial features of objects, such as a hand. In the left column of image space 1810, the top images display different masks 1830 applied to the scene, while the bottom images show hands 1840 positioned within the detection area. These images capture the raw visual details and spatial arrangements directly in the visual domain.

In the right column, these same images are transformed into frequency space 1820, which isolates specific spatial frequencies present in the scene. By translating the spatial details into the frequency domain, the system focuses on particular frequency components that correspond to the features of interest, shown as bright points or areas on the frequency map. These frequency-based signals serve as distinctive markers, allowing the system to concentrate on specific orientations or patterns within the object that align with the mask in the image space.

The system may use signal amplification and channel-wise averaging to ensure consistency across the detection channels. The system may compute a statistical variance proxy, normalizing for overall brightness, which enhances accuracy in identifying the target features. When the variance in one channel surpasses another by a threshold amount or a set multiplicative factor, the detection is considered successful, triggering an LED indicator (or other digital or analog signal). This frequency-based analysis approach enables precise feature detection, independent of the object's exact location, ensuring a robust response under various positioning or lighting conditions.

Figure 19:
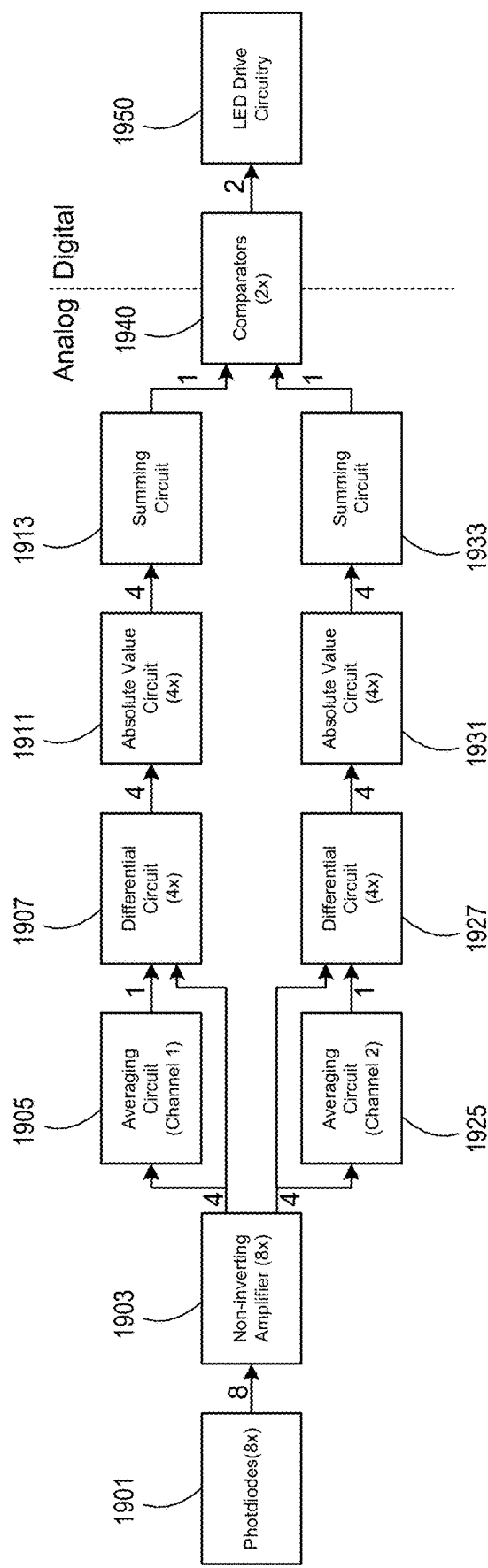
FIG. 19 depicts an analog circuit configuration for implementing a detection process, according to one embodiment.

FIG. 19 depicts an analog circuit configuration for implementing the detection process, starting with an array of eight photodiodes 1901 that capture light from the scene. These photodiodes 1901 are divided into two separate channels, with the first channel illustrated on top and the second channel illustrated on the bottom of the diagram. Each photodiode 1901 outputs a small electrical current in response to the captured light, representing the intensity from specific areas within the replicated image after passing through a mask or optical filter (such as a metasurface optical filter or binary optical filter).

The signals from each photodiode 1901 in both channels are initially passed through non-inverting amplifiers 1903, which strengthen the signals without altering their polarity, ensuring that even subtle intensity variations are sufficiently amplified for further processing. Each channel has its own dedicated circuitry to independently process the signals and evaluate differences between the channels.

In the first channel, the amplified signals are fed into an averaging circuit 1905, which calculates the average intensity for that channel. This averaged signal is then processed by a differential circuit 1907, which identifies intensity variations within the channel by measuring the difference between the averaged signal and the original amplified signal. The output from the differential circuit moves through an absolute value circuit 1911, which ensures that any differences are interpreted as positive values, regardless of polarity. Finally, a summing circuit 1913 aggregates these absolute differences, creating a combined measure of the intensity variations in the first channel.

The second channel follows a similar path. The amplified signals are averaged in an averaging circuit 1925, with differences extracted through a differential circuit 1927, converted to absolute values via an absolute value circuit 1931, and summed in a summing circuit 1933. This setup generates two cumulative values representing the intensity variations for each channel. The outputs from the two channels are then fed into comparators 1940, which assess the relative values of the signals from each channel. These comparators determine if the variance in one channel exceeds that of the other channel and/or if the value of each respective channel exceeds a threshold detection value. When one or both channels meet or exceed threshold comparison value(s), a digital signal activates the LED drive circuitry 1950. This activation lights up the LED, providing a clear visual indication of detection. In some embodiments, the output of the comparators may be fed into another detection system or computing system for further action or handling. LED indicators are useful for human visual confirmation, but direct digital or analog signal outputs indicating the detection of a specific feature or characteristic of an object may be fed as inputs into other systems.

Through this analog processing setup, real-time analysis of light intensity variations is possible, without requiring digital memory or image processing, ensuring quick and efficient detection based on spatial frequency filtering captured by the photodiodes. This configuration supports a secure and power-efficient detection system ideal for scenarios requiring instantaneous feedback.

FIG. 20A illustrates an example diagram 2000 of Haar-like features (e.g., 2010, 2011, 2012, and 2013) applied across eight identical image copies 2001-2008. The diagram 2000 provides a visual representation of how sub-windows in an image are assessed at various stages of a detection process to identify features of interest. The presently described systems and methods can be used to apply optical filters in the optical domain that include relatively simple Haar-like features to evaluate whether a sub-window contains basic facial characteristics. For instance, broad horizontal features may be used to identify a brow line, vertical features may be used to identify a nose or the gap between symmetrical eyes. Initial sub-windows may be used to identify possible features of interest. Subsequent, more detailed assessments using finer or more complex Haar-like features may be used to confirm the identification of particular features of interest or an object of interest. As sub-windows pass these initial stages, they progress through increasingly detailed assessments.

Each Haar-like feature checks for contrasts between dark and light regions of the image to identify edges, lines, and other simple patterns that make up facial structures. For example, vertical structures may be used to identify the nose bridge, and square patterns may be used to identify the eye region. In some embodiments, a hierarchical approach may be used to ensure that only sub-windows with a high likelihood of containing a face are processed further, optimizing the computational efficiency of the detection system. In the presently described systems and methods, many optical images can be processed with Haar-like filters of varying complexity levels.

FIG. 20B illustrates a high-level block diagram of a sub-window evaluation process in a detection system. The process aims to streamline feature detection within an image using a multi-stage assessment, aligning with the ultra-low-power and high-speed image processing system described in the application. Each sub-window is evaluated at each test stage and is either passed forward for further evaluation (marked by "T" for true) or rejected (marked by "F" for false). Sub-windows that do not meet the criteria at any given stage are rejected, at 2025. For example, a sub-window 2020 that fails the test at the first stage 2021 is rejected, at 2025. Any sub-window that fails the second stage test 2022 or the third stage test 2023 is rejected, at 2025. If a sub window 2020 satisfies the first, second, and third stage tests 2021, 2022, and 2023, the feature of interest is confirmed and/or the image is submitted for further processing 2027.

Figure 20C:
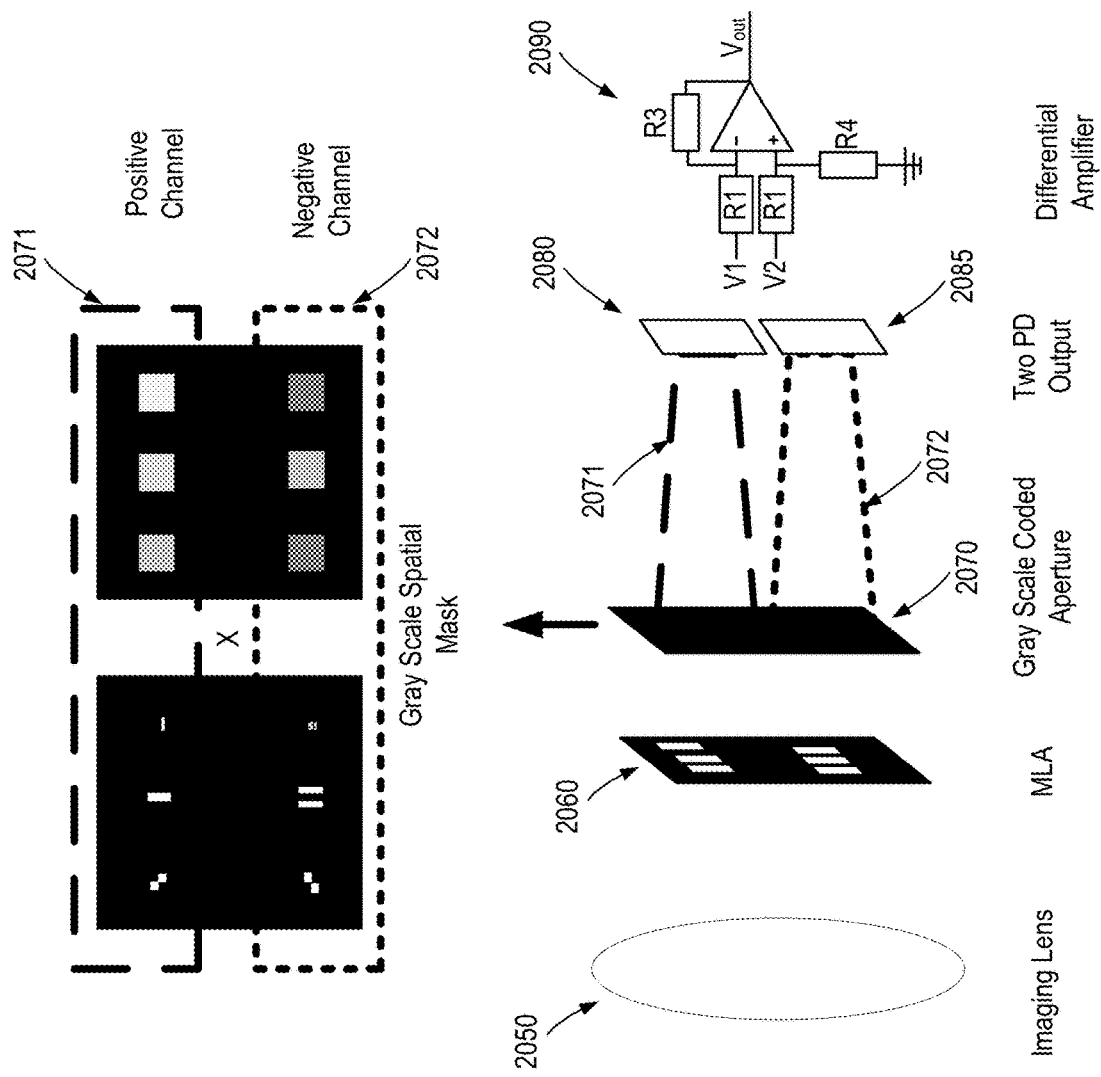
FIG. 20C illustrates a block diagram of a system for optical processing and analysis of image features, according to one embodiment.

FIG. 20C illustrates a block diagram of a system for optical processing and analysis of image features using a microlens array (MLA) 2060 (or a metasurface), grayscale spatial masks 2070, and a differential amplifier 2090 for final output interpretation. An imaging lens 2050 captures the incoming light associated with the scene or object of interest. The optical signal is then directed to a microlens array 2060 or metasurface device for image replication. That is, the microlens array 2060 splits the original image into multiple sub-images or channels to allow for parallel processing in the optical domain. Each image copy or set of image copies is part of different channels that are processed via different masks or filters that apply unique transformations and/or analysis criteria.

In the illustrated example, the image copies pass through gray-scale coded apertures or other optical filters 2070 that modulate the light with pre-defined intensity patterns. The aperture is configured with specific spatial features designed to highlight or attenuate particular characteristics within the image copies. For instance, a first gray-scale spatial mask 2071 for the positive channel and a second gray-scale spatial mask 2072 for the negative channel separate different aspects of the image copies such as contrasts, edges, or regions that may, for example, align with Haar-like features. The optical filtering step allows for the immediate physical separation of features before any electronic processing takes place, reducing computational load and power consumption.

The filtered optical signals are directed to two photodetectors 2080 and 2085 (or image sensor, photodiodes, etc.), including at least one detector 2080 for the positive channel and one detector 2085 for the negative channel. The detectors 2080 and 2085 capture the processed light and convert it into voltage signals, V1 and V2, that are compared via a differential amplifier 2090. The differential amplifier 2090 computes the difference between the channels. This differential analysis allows the system to quantify the presence and intensity of the targeted features of interest within the image copies by amplifying the contrast between positive and negative detections. The amplifier's output V_out is associated with the level of confidence that a particular feature, set of features, or target object, as defined by the spatial mask(s), is present in the original image.

The optical approach to Haar-like feature analysis enhances the speed and efficiency of the system, leveraging physical processes for initial image transformation and analysis. The use of metasurfaces or MLAs for image splitting, combined with gray-scale and/or even binary spatial masks, allows for near-instantaneous parallel processing with minimal energy requirements or data storage. As previously described, the presently described systems and methods are particularly useful for applications requiring rapid feature detection, such as real-time facial recognition, where high-speed processing and low power consumption are paramount. The system integrates optical preprocessing with electronic differential amplification to bridge the gap between complex image processing and efficient, hardware-based analysis in the optical domain.

Figure 20D:
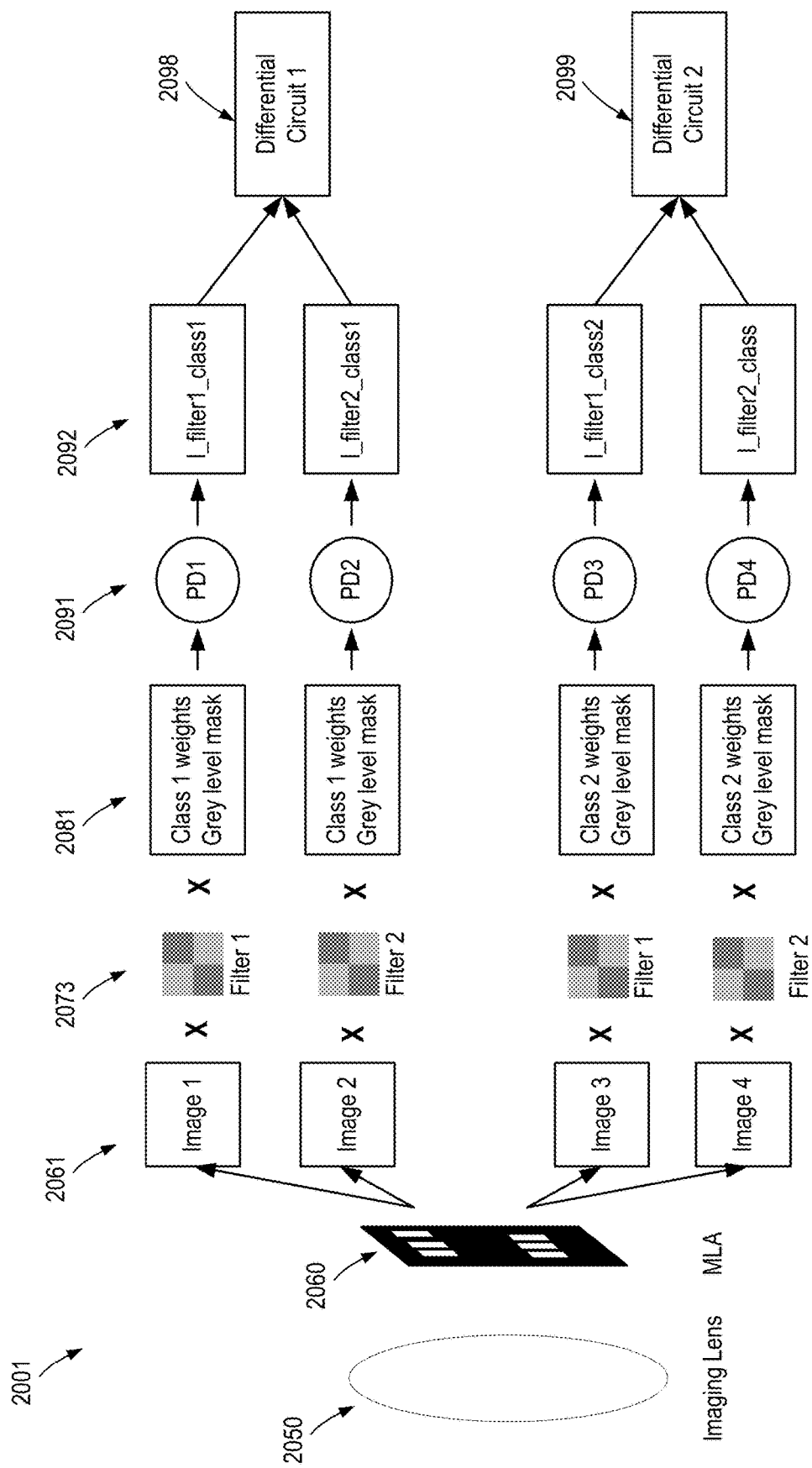
FIG. 20D illustrates a block diagram of a system for optical processing to detect features for facial recognition, according to one embodiment.

FIG. 20D illustrates a block diagram of a system 2001 for optical processing to detect features for facial recognition, according to one embodiment. The imaging lens 2050 captures light from a target scene, which might include facial features. This light is directed through the microlens array 2060, which creates multiple copies of the scene. The duplicated images 2061 are processed in parallel to extract specific feature information by passing the duplicate images 2061 through optical filters 2073, such as binary or grayscale optical filters, designed to highlight attributes for classification tasks that are associated with facial feature recognition.

Each image copy 2061, labeled Image 1 through Image 4, is paired with a designated optical filter 2073 (e.g., Filter 1 or Filter 2). The optical filter 2073 are configured to detect or other otherwise associated with particular spatial patterns within different regions of the image, such as edges, transitions, lines, symmetries, or contours that are expected in facial features. After filtering, the filtered duplicate images undergo an additional transformation via "class weights" and/or "gray level masks" 2081.

The class weights and/or gray level masks 2081 assign different weights based on the target class (e.g., Class 1 on the top or Class 2 on the bottom) to amplify or suppress certain features associated with distinct facial regions or attributes. The system uses the weighted transformation process to emphasize elements relevant to each class, such as eyes, nose, or mouth for facial recognition, so that the system can distinguish between different parts of the face. The outputs of the weighted and filtered images are directed to photodetectors 2091 (PD1, PD2, PD3, and PD4). The photodetectors 2091 convert the filtered optical information into electrical signals (voltage and/or current, as represented by the labels I_filter1_class1 and I_filter2_class1 for the upper channel and I_filter1_class2 and I_filter2_class2 for the lower channel).

Differential circuit 2098 for the upper channel (Class 1) and differential circuit 2099 for the lower channel (Class 2) combine and compare the signals from the photodetectors in each respective channel to assess the presence of facial features by highlighting contrasts and variations aligned with each target class. For example, a strong differential signal in Class 1 might indicate the detection of eye contours, while a signal in Class 2 could correspond to nose or mouth regions. The illustrated system achieves rapid and efficient facial detection, with most of the complex processing accomplished in the optical domain.

Figure 20F:
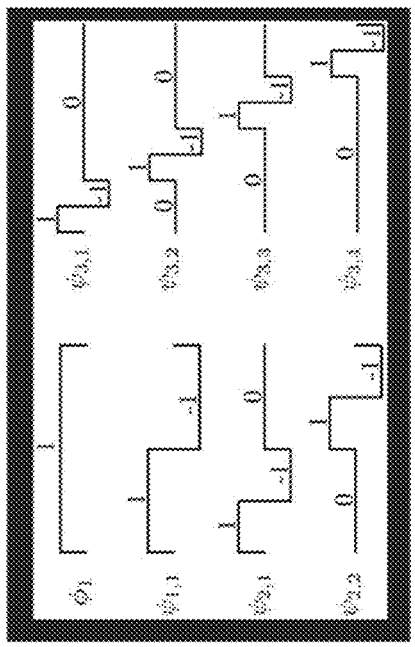
FIG. 20F illustrates wavelet representations of one-dimensional Haar basis functions, according to one embodiment.
Figure 20H:
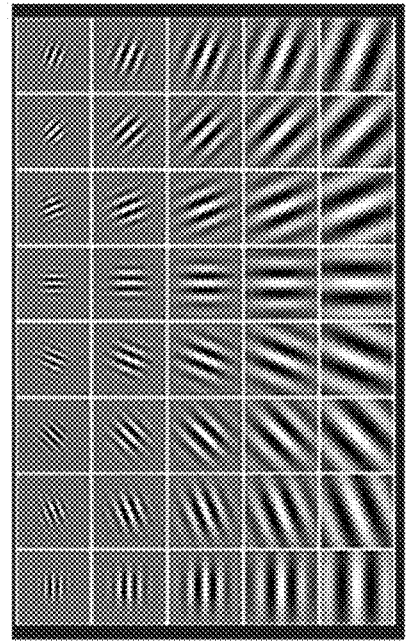
FIG. 20H illustrates an example of Gabor filters, which are an alternative to Haar-like filter patterns, according to one embodiment.
Figure 20E:
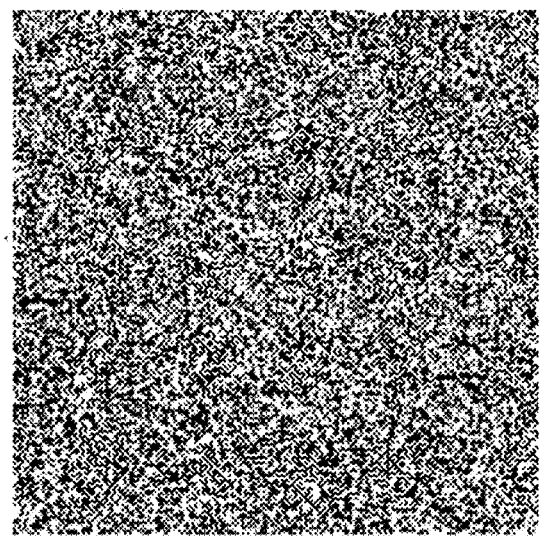
FIG. 20E illustrates an example of a trained binary filter, according to one embodiment.

FIG. 20E illustrates an example of a trained binary filter 2075, according to one embodiment. The trained binary filter 2075 comprises high-contrast black and white regions that function as an optical mask to selectively filter light passing through, and thereby encode specific features for detection. The example trained binary filter 2075 may, for example, be integrated into the grayscale coded aperture 2070 or applied as part of the gray-scale spatial masks 2071 and 2072 for the positive and/or negative channels.

FIG. 20F illustrates wavelet representations 2076 of one-dimensional Haar basis functions, according to one embodiment. A wavelet is a mathematical tool that allows complex functions or images to be represented as a sum of simpler, scaled, and shifted basis functions. The Haar wavelet is unique in its use of square-like functions as the basis, which is useful for capturing sharp changes and edges in an image.

As illustrated, the Haar wavelets have distinct, step-like structures that represent different scales and levels of detail in a hierarchical manner.

Figure 20G:
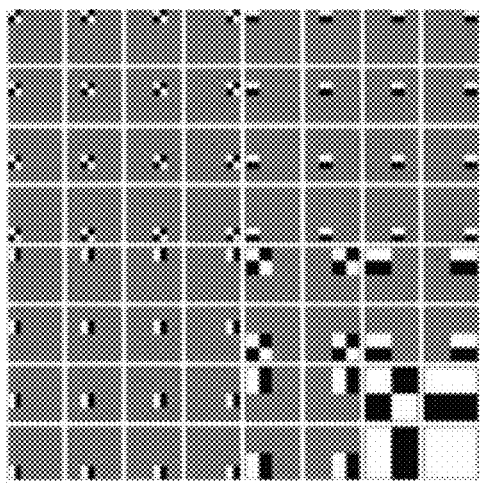
FIG. 20G illustrates a two-dimensional Haar-like optical filter as a plurality of rectangular-shaped patterns, according to one embodiment.

FIG. 20G illustrates a two-dimensional Haar-like optical filter as a plurality of rectangular-shaped patterns 2077, according to one embodiment. The filters operate by subtracting pixel values in designated white regions from those in black regions within the spatial structure of the filter. The result is a numerical output that reflects the presence or absence of that specific pattern in the analyzed section of the image. Unlike more holistic pattern detectors, such as those used in hand detection systems that analyze the entire frame, Haar-like filters provide localized analysis. The Haar-like filters can be used to highlight specific spatial areas, which can be overlaid on various regions of an image to extract feature information quickly and efficiently. Haar-like filters are provided as an example only; it is appreciated that various alternative grayscale or binary filter patterns can be used for feature analysis FIG. 20H illustrates an example of Gabor filters 2078, which are an alternative to Haar-like filter patterns, according to one embodiment. Gabor filters differ from Haar in that they have sinusoidal waveforms modulated by Gaussian envelopes and can be used to capture orientation and/or frequency characteristics in images. The presently described systems and methods may use Gabor filters to analyze textures and/or fine details, due to the frequency-selective properties of Gabor filters.

Figure 21A:
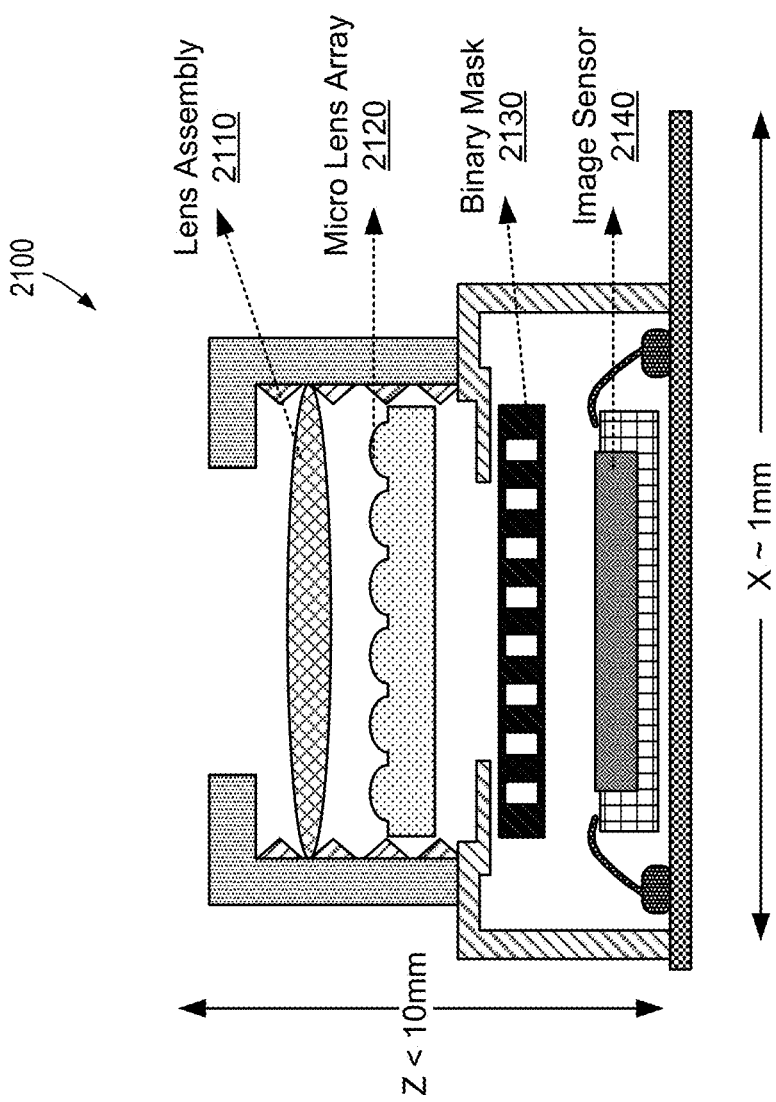
FIG. 21A illustrates a modular system architecture for a detection system, according to one embodiment.

FIG. 21A illustrates a modular system architecture for a detection system 2100, demonstrating how various optical and sensing components can be configured for compact and efficient object detection. The system 2100 includes a lens assembly 2110, which focuses incoming light onto a microlens array (MLA) 2120. The MLA 2120 replicates the image into multiple smaller sections that are directed through different binary masks 2130 and onto specific regions on the image sensor 2140. The underlying sensor regions can be used at full resolution or "binned" into a single active area for optical average pooling, lower memory requirements, and faster data readout.

As illustrated, each replicated image from the MLA 2120 passes through a binary mask 2130 that contains eight distinct mask patterns (the number of duplicated images and corresponding mask patterns can be adjusted). Each mask pattern is configured to filter specific spatial frequencies, orientations, patterns, etc., as described herein, for the selective detection of target features or characteristics of an object. The filtered light is captured by an image sensor 2140, which processes these distinct, masked views of the object. This segmented approach enables the system to detect nuanced features or orientations without requiring memory storage, computationally intensive digital processing, or traditional image capture.

The optical detection device described herein is applicable in a range of applications that rely on spatial frequency and/or feature-based recognition. For example, the device can be used for hand gesture detection by filtering for spatial frequency components and/or orientations associated with different hand positions and gestures. The system may use specific filter patterns to isolate spatial features such as the eyes, ears, nose, or mouth for facial recognition, facial movements (e.g., head nods or head shakes), facial symmetry, user attention, and/or facial expression recognition, such as smiles or frowns, or any combination thereof. Predefined filter patterns can be configured to detect shape and texture details unique to specific objects to facilitate object identification, such as radius of curvature, and/or isolating light signatures that correspond with skin. Further, the device can detect user movement by capturing real-time orientation changes, user orientation to determine the direction a user faces, and object orientation by detecting positional variations of an object.

Various embodiments of the systems and methods described herein may be used in a wide variety of environments and devices, including, for example, for entertainment, security, access control, device interaction, interactive and augmented reality applications, etc. As an example, in one application, a high-speed, low-power face detection system using the systems and methods described herein can be configured to toggle the screen of a mobile device, such as a laptop or smartphone, based on user engagement. The high-speed, low-power face detection system may identify facial features such as eyes and/or even the pupil within an eye based on shape, spatial frequency information, color tones, reflectance, etc. When the system detects that a user is looking at the screen, the display is switched on. Conversely, the screen can turn off immediately when the user looks away. This approach allows for an imperceptible transition, where the display reactivates nearly instantaneously as the user glances back. Such an implementation could achieve significant power savings, potentially reducing battery consumption by 15-20% or more, given that the display typically accounts for a significant portion of device power usage. Additionally, the approach enhances usability by eliminating the need for manual power management settings, such as determining inactivity intervals or requiring user input to resume from a sleep state (e.g., a low-power state). These benefits are optimized by the low-power operational demands of this detection system, ensuring minimal impact on the device's overall energy efficiency. Implementing a similar feature using traditional computer-vision digital processing techniques would have higher latency that would be perceptible by the user, rendering it unusable, and would not provide significant power savings, possibly even resulting in a net power loss.

This architecture can be manufactured with a footprint of, for example, 1 mm×1 mm and with a vertical height of less than, for example, 7 mm, making it suitable for applications where space is limited. The modularity also allows flexibility in choosing between discrete photodiodes or a segmented image sensor for added adaptability. By integrating these elements in a compact package, the system is highly power-efficient and cost-effective, ideal for real-time detection applications requiring a minimalistic yet effective design. In some embodiments, the binary mask 2130 is implemented as a standalone component above the image sensor 2140 or integrated directly onto the surface of the image sensor 2140 using CMOS-compatible processes (e.g., as a dielectric or metal layer formed directly onto the sensor that is etched to form the mask pattern). In some implementations, this may allow for smaller packaging and/or greater precision in alignment.

Figure 21B:
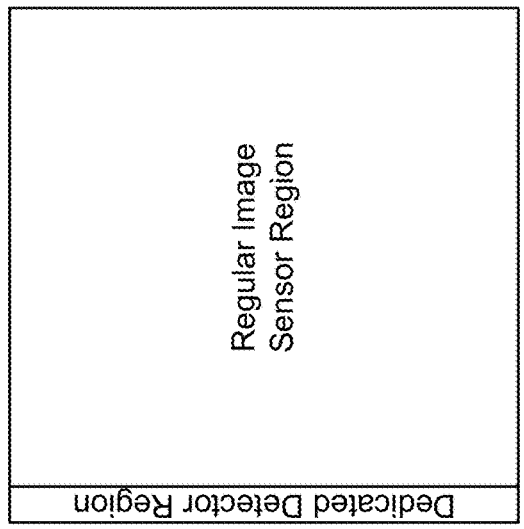
FIGS. 21B, 21C, and 21D illustrate different configurations for incorporating a dedicated feature detection area into a high-resolution image sensor, according to one embodiment.
Figure 21C:
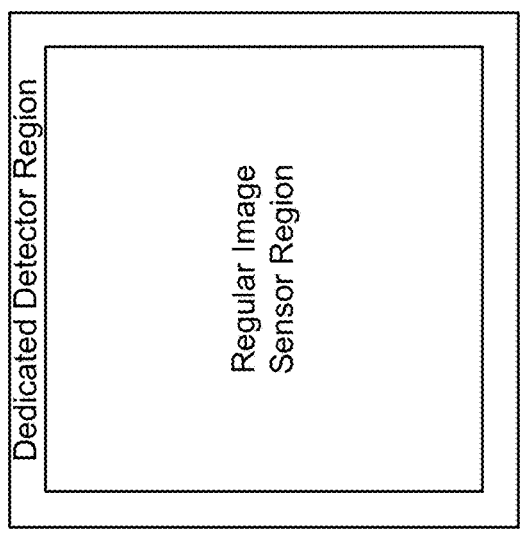
Figure 21D:
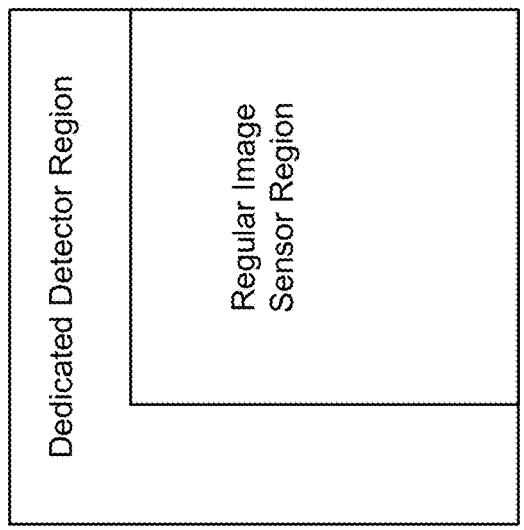

FIGS. 21B, 21C, and 21D illustrate different configurations for using an image sensor as both a high-resolution image capture device and a dedicated feature detection area, in different modes of operation. Each configuration demonstrates a way to segment part of the sensor area for specialized detection using masks (e.g., optical filters, binary filters, metasurface filters, etc.) that are applied directly onto the sensor surface, providing efficient and compact dual functionality.

In FIG. 21B, the image sensor 2141 is configured with the left edge designated as a dedicated detection region. This portion of the sensor focuses exclusively on detecting specific features within the scene, using masks or filters to highlight, for example, the detection of particular spatial frequencies or orientations. The rest of the sensor captures a normal high-resolution image of the full scene, enabling the system to perform feature detection and image capture simultaneously. By reserving the left edge for detection, this setup allows the sensor to deliver rapid feature detection results without interfering with the main image capture area. In some embodiments, the system can toggle between a high-speed, low-power, low-memory state restricted to the dedicated detection region only when full-resolution images are unnecessary. The system can toggle to a high-power, higher latency, high memory state when the full sensor is active.

FIG. 21C shows a similar design, where the image sensor 2142 has all four edges allocated to detection, forming a detection perimeter around the central image capture region. This layout maximizes the detection area while keeping the primary imaging area focused on a high-resolution capture of the scene. This configuration may improve feature detection coverage across the full field of view, as any feature moving into the sensor's peripheral zones can be quickly detected, enhancing responsiveness without sacrificing image quality in the central region.

In FIG. 21D, the image sensor 2143 is segmented with two larger regions along the edges designated for detection. These two regions offer an expanded detection area compared to the single-edge approach, providing more surface area for filtered or masked signals. The remaining area continues to capture the full-resolution image of the scene. Each of these configurations may take advantage of direct patterning on the sensor using CMOS-compatible processes, where masks or filters can be either etched directly onto the sensor or applied as a dielectric or metal layer. This approach enables precise segmentation of the sensor for dual purposes, combining efficient feature detection with the traditional high-resolution capture in a single, compact design.

FIG. 22 illustrates two different Bayer color filter configurations on image sensors. In the left image, sensor 2210 shows a traditional Bayer color filter mask with red, green, and blue (RGB) pixels arranged in a grid pattern. This configuration is commonly used in image sensors to capture full-color images by assigning each pixel to a specific color channel. The standard Bayer pattern has twice as many green pixels as red or blue to mimic the human eye's sensitivity to green wavelengths, resulting in a high-quality color image.

In the right image, sensor 2220 presents a modified Bayer color filter mask. This variation introduces dedicated detector pixels (represented by dark squares) in place of four of the standard RGB pixels. These detector pixels are not covered by color filters but are instead configured to perform specific detection tasks, such as spatial frequency analysis or object detection, as described herein. By including these masked detector pixels within the Bayer array, the sensor can simultaneously capture high-resolution color images while also providing real-time data from the dedicated detection pixels, which may respond to features like edges, orientations, or particular spatial frequencies.

This modified configuration allows for both image capture and detection functionality on a single sensor chip. Using CMOS-compatible processes, the dedicated detection pixels can be integrated directly onto the sensor by etching masks onto a dielectric or metal layer placed above the sensor. This design enables a streamlined fabrication process where the detector masks are embedded into the existing Bayer filter layer, achieving enhanced functionality without adding significant size or complexity to the sensor.

By integrating detection masks into the Bayer pattern, this modified sensor design provides an efficient, compact solution for applications requiring both imaging and feature detection. The detector pixels can act as a preliminary filter for specific object characteristics, allowing the system to trigger responses or adjust imaging parameters based on detected features while continuing to capture a full-color image through the remaining RGB pixels. This dual functionality is particularly useful in systems that need real-time detection, such as gesture recognition, security systems, or augmented reality applications, while still maintaining high image quality. In some embodiments, the detector pixels may operate outside of the visible range used by the RGB pixels (e.g., the detector pixels may operate in the infrared frequency range).

This disclosure has been made with reference to various embodiments, including the best mode. However, those skilled in the art will recognize that changes and modifications may be made to the various embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure as encompassed by the claims below, which form a part of this disclosure.

What is claimed is:

1. A feature detection system, comprising:
   a lens assembly to focus light of an optical image onto a microlens array that replicates the optical image to form a plurality of optical image replicas;
   a plurality of optical filters, wherein each optical filter is placed within an optical path of one of the optical image replicas, each optical filter configured to selectively filter one of the optical image replicas, wherein the plurality of optical filters comprises a plurality of binary optical filter masks; and
   a multipixel image sensor comprising:
      a segmented detection region of pixels to receive each of the filtered optical image replicas from the plurality of optical filters for feature detection, and
      an image capture region of pixels to capture a high-resolution image of the optical image.

2. The feature detection system of claim 1, further comprising an illumination source configured to emit infrared light to enhance contrast within the optical image replicas.

3. The feature detection system of claim 1, wherein the segmented detection region of pixels includes dedicated detection pixels that provide intensity-based feature detection data in real-time.

4. The feature detection system of claim 1, wherein one of the binary optical filter masks is configured to selectively attenuate specific portions of the optical image replicas for orientation-specific feature detection within the segmented detection region.

5. A feature detection system, comprising:
   a lens assembly to focus light of an optical image onto a microlens array that replicates the optical image to form a plurality of optical image replicas;
   a plurality of optical filters, wherein each optical filter is placed within an optical path of one of the optical image replicas, each optical filter configured to selectively filter one of the optical image replicas, wherein the plurality of optical filters comprises a plurality of metasurface optical filters; and a multipixel image sensor comprising:
  a segmented detection region of pixels to receive each of the filtered optical image replicas from the plurality of optical filters for feature detection, and
  an image capture region of pixels to capture a high-resolution image of the optical image.

6. A feature detection system, comprising:

a lens assembly to focus light of an optical image onto a microlens array that replicates the optical image to form a plurality of optical image replicas;

a plurality of optical filters, wherein each optical filter is placed within an optical path of one of the optical image replicas, each optical filter configured to selectively filter one of the optical image replicas, wherein each optical filter in the plurality of optical filters is configured to filter a specific spatial frequency of the optical image for detection of features based on spatial frequency variations within the optical image replicas; and a multipixel image sensor comprising:
  a segmented detection region of pixels to receive each of the filtered optical image replicas from the plurality of optical filters for feature detection, and
  an image capture region of pixels to capture a high-resolution image of the optical image.

7. A feature detection system, comprising:

a lens assembly to focus light of an optical image onto a microlens array that replicates the optical image to form a plurality of optical image replicas;

a plurality of optical filters, wherein each optical filter is placed within an optical path of one of the optical image replicas, each optical filter configured to selectively filter one of the optical image replicas;

a multipixel image sensor comprising:
  a segmented detection region of pixels to receive each of the filtered optical image replicas from the plurality of optical filters for feature detection, and
an image capture region of pixels to capture a high-resolution image of the optical image; and a signal processing module configured to:
  analyze the intensity variations within the segmented detection region of pixels, and
generate a feature detection signal based on the intensity patterns identified across the optical image replicas.

* * * * *